(12) United States Patent
Leigh et al.

(10) Patent No.: US 12,107,816 B2
(45) Date of Patent: Oct. 1, 2024

(54) INTERACTIVE COMPONENTS FOR USER COLLABORATION

(71) Applicant: Microsoft Technology Licensing, LLC, Redmond, WA (US)

(72) Inventors: Yan Zhong Leigh, Kirkland, WA (US); Kyle Patrick Curlett, Seattle, WA (US); Ankur Lal, Seattle, WA (US); Zohaib Rauf, Seattle, WA (US); Sathish Kumar Venkat Rangam, Kirkland, WA (US); Cosmin Catrinescu, Kirkland, WA (US); Jonathan Seth Kaufthal, Seattle, WA (US); Brian Daniel Meersma, Redmond, WA (US); Maya Rodrig, Seattle, WA (US); Humberto Lezama Guadarrama, Redmond, WA (US); Betsy Yu-pui McIntyre, Redmond, WA (US); William Dean Saulnier, Seattle, WA (US); Jiuqing Song, Sammamish, WA (US); Arnavi Mahendra Chheda, Kirkland, WA (US); Yue Ma, Bellevue, WA (US); Leeviana Peng Gray, Bellevue, WA (US); Barnabas James Whitfield, Seattle, WA (US); Andrei Valentinovich Zenkovitch, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 194 days.

(21) Appl. No.: 17/065,416

(22) Filed: Oct. 7, 2020

(65) Prior Publication Data
US 2022/0109651 A1  Apr. 7, 2022

(51) Int. Cl.
  *H04L 51/42* (2022.01)
  *G06F 3/0482* (2013.01)

(52) U.S. Cl.
  CPC ............ *H04L 51/42* (2022.05); *G06F 3/0482* (2013.01)

(58) Field of Classification Search
  CPC ....... H04L 51/42; H04L 51/18; H04L 51/046; G06F 3/0482; G06F 3/0481
  See application file for complete search history.

(56) References Cited

U.S. PATENT DOCUMENTS 8,938,669 B1 * 1/2015 Cohen .................. H04L 63/101
  709/204
9,479,469 B2 * 10/2016 Kabbes .................. H04L 51/00
(Continued)

OTHER PUBLICATIONS

Warren, Tom, "Microsoft's New Fluid Office Document Is Google Docs on Steroids", Retrieved from: https://www.theverge.com/2020/5/19/21260005/microsoft-office-fluid-web-document-features-build, May 19, 2020, 10 Pages.
(Continued)

*Primary Examiner* — Rami R Okasha

(57) ABSTRACT

System and methods are directed to displaying interactive content with static content in a user interface of an application. More specifically, it may be determined that an interactive component is to be rendered in a user interface of a first application, where the user interface includes static content. In response to determining that the interactive component is it be rendered, at least one linking parameter may be determined for linking the interactive component with interactive content stored in a shared storage. Based on the at least one linking parameter, the interactive component may be rendered in the user interface of the first application in-line with the static content of the user interface of the first application. Changes to the interactive content made by a
(Continued)

second user of a second application may then be updated within the interactive component rendered in the user interface of the first application.

17 Claims, 18 Drawing Sheets

(56) References Cited

U.S. PATENT DOCUMENTS

| | | | | |
|---|---|---|---|---|
| 10,572,135 | B1* | 2/2020 | Fieldman | H04L 67/06 |
| 2012/0110443 | A1* | 5/2012 | Lemonik | G06F 40/197 |
| | | | | 715/255 |
| 2012/0110445 | A1* | 5/2012 | Greenspan | G06F 40/169 |
| | | | | 715/256 |
| 2013/0124978 | A1* | 5/2013 | Horns | G06F 40/169 |
| | | | | 715/780 |
| 2013/0219296 | A1* | 8/2013 | Thazhmon | G06Q 10/107 |
| | | | | 715/752 |
| 2014/0149857 | A1* | 5/2014 | Vagell | G06F 40/169 |
| | | | | 715/255 |
| 2015/0154156 | A1* | 6/2015 | Meyers, Jr. | G06F 40/134 |
| | | | | 715/205 |
| 2016/0285795 | A1* | 9/2016 | Beausoleil | H04L 67/1097 |
| 2016/0328368 | A1* | 11/2016 | Hyams | G06F 40/194 |
| 2016/0378737 | A1* | 12/2016 | Keslin | H04L 12/1822 |
| | | | | 715/753 |
| 2017/0364866 | A1* | 12/2017 | Steplyk | G06Q 10/063114 |
| 2018/0152407 | A1* | 5/2018 | Soni | H04L 51/234 |
| 2018/0246933 | A1* | 8/2018 | Darrow | G06F 16/252 |
| 2018/0337968 | A1* | 11/2018 | Faulkner | H04L 51/046 |
| 2019/0004639 | A1* | 1/2019 | Faulkner | G06F 3/048 |
| 2019/0114366 | A1* | 4/2019 | Gupta | G06F 16/954 |
| 2019/0129930 | A1* | 5/2019 | Rothschiller | G06F 16/176 |
| 2019/0171837 | A1* | 6/2019 | Thoren | G06F 16/252 |
| 2020/0153766 | A1* | 5/2020 | Parr | H04W 4/14 |
| 2020/0344188 | A1* | 10/2020 | Raskin | G06F 3/0486 |
| 2021/0409365 | A1* | 12/2021 | Mitchell | H04L 51/046 |

OTHER PUBLICATIONS

Gmail Snippets, text snippets, text expander for Gmail—cloudHG, retrieved from internet Oct. 22, 2020; https://www.gmail-snippets.com.

* cited by examiner

INTERACTIVE COMPONENTS FOR USER COLLABORATION

BACKGROUND

Messaging applications, such as email applications, chat applications, and the like, are widely utilized in business and personal communications. Such communications typically involve exchanges of multiple messages between users of the applications. For example, a discussion on a topic between multiple users may be conducted in an email exchange chain in which users may exchange a number of email messages to provide information and ideas about the topic. If a user later wishes to review the discussion to find certain information, the user may need to look through the multiple email messages to find the information, which may be cumbersome and not time efficient. As a result, collaboration between users using messaging applications is often not effective.

Some collaborative or co-authoring applications allow multiple users to perform operations, such as editing operations, on contents of a document that may be accessible by the multiple users via the applications. In a typical collaboration scenario, a user may create a document in a specialized application, such as a word processing application, and may share the document with one or more other users, for example by sending a link to the document in a message (e.g., an email message) to the one or more other users. A recipient of such message may view the message in a messaging application, such as an email application, and may click on the link in the message to navigate away from the messaging application and open the document in another application, such as a word processing application. The user may then collaborate with one or more other users on the content of the document in the word processing application. Messaging applications themselves, however, do not typically allow users to collaborate without exchanging multiple messages and without navigating away from the messaging application.

It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, messaging applications, such as email, social networking platforms, or chat applications, are configured to allow users to collaborate on interactive content within a message in a messaging application. In this way, users can collaborate without exchanging multiple messages and without navigating away from the messaging application. In the context of messaging applications, interactive content, such as an items list, a paragraph, an agenda, a table, a chart, etc., may be inserted into a message by a sender of the message. When the message is sent to one or more recipients, users (e.g., the sender and/or a recipient of the message) can view the message, including the interactive content, in respective messaging applications. For instance, the interactive content may be included in an interactive component that may be rendered in, for example, a GUI element, a frame, a pane, etc. and displayed to the users directly within the message in the respective messaging applications, for example in-line with what may otherwise be static content of the message displayed in reading panes of the messaging applications.

In aspects, the users may make changes to the interactive content directly in the respective messaging applications, for example, by entering desired changes directly in the message displayed in the reading pane of the messaging application. Renderings of the interactive content in respective messaging applications may be synchronized among the multiple messaging applications such that changes made to the interactive content of a message by a user via one of the messaging applications are reflected in the renderings of the interactive content displayed to other users in other ones of the messaging applications. Thus, the present systems and methods allow users to interact via the interactive content in a message without having to "reply" to the message in the messaging application and without having to navigate away from the messaging application. Moreover, such interactions may be captured within the message and may be viewed by the users at any time when the message is displayed in the messaging application. As a result, the present systems and methods may provide for more effective collaboration that may be possible in typical messaging applications. Although examples are described herein within the context of messaging applications, the disclosure is not so limited. In other aspects, interactive content may be rendered within other types of applications, e.g., word processing applications, presentation applications, spreadsheet applications, notebook applications, and the like.

In aspects, a system is provided. The system includes one or more computer readable storage media and program instructions stored on the one or more computer readable storage media that, when executed by at least one processor, cause the at least one processor to perform operations. The operations include causing a user interface of a first application to be rendered on a display of a first device, and determining that an interactive component is to be rendered in the user interface, where the user interface comprises static content. The operations further include, in response to determining that the interactive component is it be rendered in the user interface, determining at least one linking parameter for linking the interactive component with interactive content stored in a shared storage, and causing the interactive component to be rendered in the user interface based on the at least one linking parameter, where rendering the interactive component causes display of the interactive content with the static content of the user interface. Changes to the interactive content made by a second user of a second application may be updated in real-time within the interactive component rendered in the user interface of the first application.

In further aspects, a method for displaying interactive content in a first messaging application is provided. The method includes rendering a user interface of the first messaging application in a display of a first device. The method also includes receiving a first indication to compose a message in the user interface of the first messaging application, where the message comprises static content, and receiving a second indication to insert an interactive component within the message in the user interface of the first messaging application. The method additionally includes, in response to receiving the second indication, creating the interactive component. Creating the interactive component includes determining at least one linking parameter for rendering the interactive component and linking interactive content associated with the interactive component to a shared storage. The method further includes, based on the at least one linking parameter, rendering the interactive component within the message in the user interface of the first messaging application, where rendering the interactive component comprises displaying the interactive content associated with the interactive component with the static content of the message. Changes to the interactive content made by a second user of a second messaging application may be updated in real-time in the interactive component rendered within the message in the user interface of the first messaging application.

In still further aspects, a computer storage medium is provided. The computer storage medium stores computer-executable instructions that when executed by at least one processor cause a computer system to perform operations. The operations include receiving a message to be displayed in a user interface of a first messaging application, the message comprising an indication that an interactive component is to be rendered in-line with static content of the message in the user interface of the first messaging application. The operations additionally include processing the received message to determine at least one linking parameter for linking the interactive component with interactive content stored in a shared storage, and, based on the at least one linking parameter, retrieving at least the interactive content from the shared storage. The operations further include causing the message to be rendered in the user interface of the first messaging application. Rendering the message in the user interface of the first messaging application includes rendering the interactive component, with the interactive content retrieved from the shared storage, within the message in-line with the static content of the message in the user interface of the first messaging application. The operations additionally include receiving, in real-time, an indication of a change to content in the interactive component, where the change results from an interaction with the interactive content via a second messaging application, and updating, in real-time, the rendering of the interactive component with the change to the interactive content in the user interface of the first messaging application.

Any of the one or more above aspects in combination with any other of the one or more aspects. Any of the one or more aspects as described herein.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
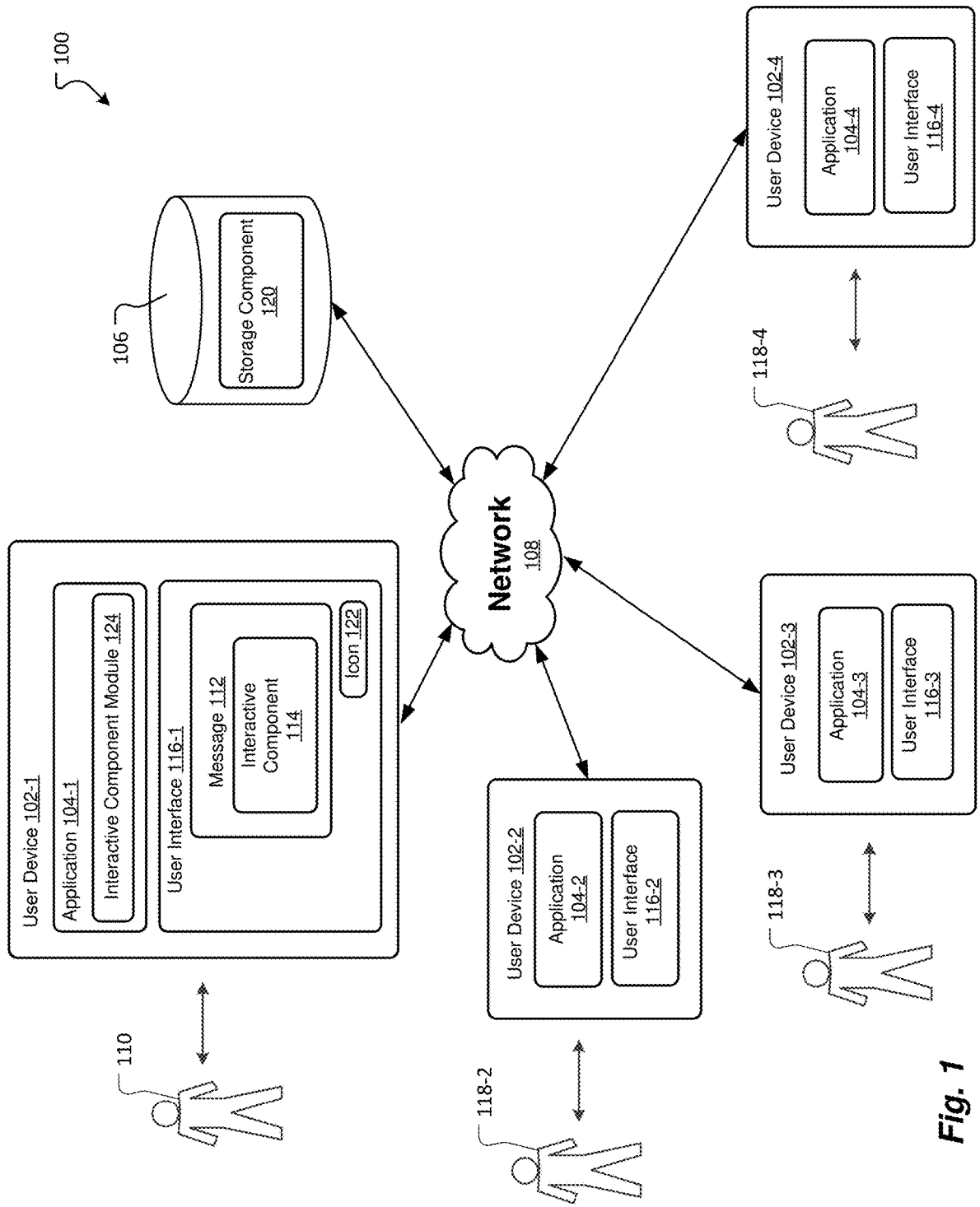
FIG. 1 is a block diagram of a system in which interactive components may be embedded into a user interface of an application, in accordance with an embodiment of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, messaging applications, such as email or chat applications, allow users to collaboratively interact from within a message that may be viewed by the users in respective messaging applications, without exchanging multiple messages and without navigating away from the messaging application. One or more interactive components may be embedded into a message that may be sent from a sender to one or more recipients via a messaging application. In aspects, a user interface associated with a messing application may comprise one or more panes, or windows, for presenting messages to a user. For example, the user interface may comprise a navigation pane (for navigating between message folders, such as sent mail or an inbox), a list pane (for viewing a listing of messages within a message folder such as an inbox), and a reading pane (for viewing a message selected from the list pane associated with a message folder such as sent mail).

Examples of interactive components that may be embedded into a message include, but are not limited to, check lists, item lists, text paragraphs, meeting agendas, tables, charts, etc. After the message is sent, when the message is viewed by a user (e.g., the sender or a recipient of the message) in a window pane (e.g., reading pane) of the messaging application user interface, the one or more interactive components may be rendered and displayed to the user directly within the message in the window pane. In aspects, the one or more interactive components may be rendered in-line with what may otherwise be static content (e.g., text) of the message. The user may be able to make changes to content of an interactive component directly in the message displayed in the window pane of the messaging application, for example, by entering the changes directly into the interactive component displayed in the window pane of the messaging application.

Renderings of an interactive component that may be embedded into a message displayed to multiple users (e.g., the sender and one or more recipients) in respective messaging applications may be synchronized among the messaging applications such that changes to content of an interactive component made by a user in one of the messaging applications are automatically reflected in the interactive components in other ones of the messaging applications. To enable collaboration, in an embodiment, content of an interactive component may be stored and maintained in a shared storage accessible by the messaging applications, and renderings of the interactive component may be synchronized via the content stored and maintained in the shared storage accessible by the messaging applications. When a user views a message in a window pane of a messaging application, current content of the interactive component may be obtained from the shared storage by the messaging application and placed into the interactive component rendered within the message. Thus, any changes that may have been made to the content of the interactive component by various users (e.g., sender of the message and/or recipients of the message) since the last time that the message was viewed by the user may be reflected in the content of the interactive component rendered within the message by the messaging application. Moreover, in some aspects, real-time synchronization between concurrently live renderings of an interactive component within the message may be provided. For example, changes made to the content of the interactive component from within a message displayed to a recipient in one of the messaging applications may be visible in real time in the renderings of the interactive component that may be concurrently displayed within messages to other recipients and the sender in other ones of the messaging applications. In this example, the recipient need not reply to the message for the changes to the interactive component to be reflected in the message for the other recipients (e.g., within reading panes associated with respective inboxes) and the sender (e.g., within a reading pane associated with a sent mail folder).

By embedding interactive content into messages shared in messaging applications, the present disclosure enables rendering, displaying and collaborative interaction with the interactive content directly in user interfaces of the respective messaging applications. By providing synchronization between renderings of the interactive content in respective user interfaces of the messaging applications, the present systems and methods provide interactive and collaborative experiences that are not possible and/or are inefficient with current messaging applications. As an example, in an email messaging application, an interactive component that asks a set of questions may be embedded into an email message, and once sent, the interactive component may be rendered and displayed to one or more recipients within the email message in reading panes of the respective messaging applications. The recipients may provide answers to the questions by typing or otherwise entering the answers directly into the interactive component rendered and displayed within the message in the reading panes of the recipients' messaging applications. The answers may be reflected in renderings of the interactive component when the message is displayed to the sender (e.g., within the sent mail folder) and other recipients of the message (e.g., within respective inboxes) in user interfaces of their respective messaging applications. The answers may thus be contained within a single message rather than scattered over multiple messages that would result from back and forth message exchanges between the sender and the recipients using traditional messaging applications. As another example, a message containing an interactive component comprising an action items list may allow a recipient of the message to check items off the action items list and/or add additional items to the action items list from directly within the message displayed to the recipient in a user interface of the messaging application. The changes to the action items list made by the recipient may be visible, in real time or at a later time, to the sender and any other recipients of the message directly when the message is displayed in their respective messaging applications, without requiring additional message exchanges and without requiring the participants to navigate away from their messaging applications. As illustrated by the examples above, the present methods and systems allow for more efficient collaboration in messaging applications than is currently available to users of messaging applications. Of course, many other collaborative experiences may also be provided.

It should be appreciated that although, for exemplary purposes, described embodiments generally relate to messaging applications and, more particularly, email applications, the present methods and systems are not so limited. For example, interactive components described herein may be used to provide collaborative experiences in applications other than messaging and/or email applications, such as word processing applications, spreadsheet applications, notebook applications, presentation applications, instant messaging or chat applications, social networking platforms, and the like.

FIG. 1 illustrates an overview of an example system 100 in which users may effectively collaborate using interactive components that may be displayed to users in user interfaces of applications, such as interactive components rendered in messages associated with messaging applications, in accordance with embodiments of the present disclosure. The system 100 may include a plurality of user devices 102 that may be configured to run or otherwise execute applications 104. The user devices 102 may include, but are not limited to laptops, tablets, smartphones, and the like. The applications 104 may include applications having messaging features ("messaging applications"), such as email applications, chat applications, meeting applications, instant messengers, and the like, and/or may include other suitable types of applications, such as word processing applications, spreadsheet applications, notebook applications, and the like. Non-limiting examples of applications 104 include Microsoft™ Outlook™, Gmail™, Microsoft™ Teams™, Google™ Hangouts™ and Facebook™ Messenger. In some examples, the applications 104 may include web applications, such as but not limited to Outlook Web Access™ or Gmail™ web applications, where such applications 104 may run or otherwise execute instructions within web browsers. In some examples, the applications 104 may additionally or alternatively include native client applications residing on the user devices 102.

The plurality of user devices 102 may be communicatively coupled to a shared storage 106 via a communication network 108, and may enable communication between the applications 104 and the shared storage 106 as well as communications between different ones of the applications 104 (e.g., 104-1, 104-2, etc.). The communication network 108 may be a wide area network (WAN) such as the Internet, a local area network (LAN), or any other suitable type of communication network. In some embodiments, the communication network 108 may be a single communication network or may be made up of multiple different communication networks. Non-limiting examples of shared storage 106 include Microsoft™ SharePoint™, Microsoft™ OneDrive™, Google™ Drive™ and DropBox™. In some embodiments, the shared storage 106 may be accessible by at least some of the applications 104 in a suitable manner other than via the communication network 108. For example, in some examples, the shared storage 106 may be included in or directly coupled to a user device 102, and may be locally accessibly by an application 104 executing on the user device 102, while applications 104 executing on the other user devices 102 may access the shared storage 106 by way of the communication network 108.

The applications 104 may allow users of the user devices 102 to communicate (e.g. send messages such as email messages, text messages (e.g., SMS), and/or instant messages), or otherwise interact, over the communication network 108. In an embodiment, at least some of the applications 104 may be configured to allow users to embed interactive components into messages, such as email, text or chat messages, and may be configured to render and display the interactive components within the messages in window panes (e.g., reading panes) of user interfaces of the applications 104. An interactive component may be rendered and displayed, for example, in a GUI element such as a frame, a pane, and the like within a window pane (e.g., a reading pane) displaying the message. Such interactive components embedded into messages may allow the users to collaboratively interact from directly within the messages displayed in the window panes of the user interfaces of the applications 104, without exchanging further messages and without navigating away from the applications 104.

As described in more detail below, according to an embodiment, interactive components may be shared between users via a link, such as a Uniform Resource Locator (URL) link, within a message. The link may include linking parameters that identify, for example, a path to content of an interactive component and instructions for rendering the interactive component within the message in a window pane (e.g., a reading pane) that is displaying the message. For instance the linking parameters may include a path to content of the interactive component that is stored and maintained in the shared storage 106. Additionally, in at least some scenarios, the linking parameters may include a path (or pointer) to instructions that may be needed to render and run the interactive component in the messaging application. Thus, an application 104 may be configured to embed an interactive component into a message by embedding or encoding a corresponding link into the message before sending or saving the message.

When a user views a message with an embedded interactive component in an application 104, the application 104 may use the linking parameters in the message to retrieve content of the interactive component from the shared storage 106 and display the content in the interactive component within the message in the user interface of the application 104. In some embodiments, the application 104 may be configured to cause changes to the content of the interactive component made by a user (e.g., user 110 and/or users 118) to be provided to the shared storage 106. In this way, the content stored in the shared storage 106 may be updated to reflect the changes made by the user via the interactive component rendered within a message in a respective application 104. In some embodiments, by retrieving the updated content from shared storage 106, applications 104 (e.g., 104-1, 104-2, etc.) may also be configured to receive and display the updated content of the interactive component rendered within a message in respective messaging applications for different users (e.g., other recipients and/or the sender of the message). Accordingly, the most current content of an interactive component in a message may be displayed to a user (e.g., a recipient user 118 and/or a sender user 110) by an application 104 (e.g., 104-1, 104-2, etc.) at any time that the message is selected from a list pane and displayed in a reading pane of a user interface of a respective application 104. Moreover, in some embodiments, if the message is concurrently displayed to multiple users via respective applications 104, changes made to the content of the interactive component of the message by one of the users (e.g., the sender or a recipient) of the application 104 may be visible, in real time, to the other users (e.g., the sender or another recipient) via the rendering of the interactive component within the message in the other ones of the applications 104.

For exemplary purposes, embodiments and scenarios described below are generally described with reference to applications 104 being email applications that may be used by users (e.g., users 110 or users 118) of the user devices 102 to send, receive and view email messages. As noted above, however, it should be appreciated that the present methods and systems are not limited to email applications and email messages. In other embodiments, the present methods and systems may be used to enable collaborative experiences in applications other than email applications.

Referring still to FIG. 1, in an example scenario, a user 110 ("sender") may compose an email message 112, and may insert an interactive component 114 into the email message 112. The user 110 may compose the email message 112 using a user interface 116-1 of an application 104-1 which, in this case, may be an email client application executing on the user device 102-1 or in a browser on the user device 102-1. The user interface 116-1 may be rendered on a display of the user device 102-1. Content of the interactive component 114 (and, in some cases, instructions for rendering the content or a path to such instructions) may be stored in a storage component 120 in the shared storage 106, and the interactive component 114 may be embedded into the email message 112 by embedding or encoding, into the email message 112, a link including linking parameters identifying the storage component 120 in the shared storage 106. For example, the linking parameters may be encoded into, or included in, a parameter (e.g., a 'nay' parameter) in a link (e.g., a URL) that may be embedded into the email message 112. The email message 112 may then be sent to one or more users 118 ("recipients") via the communication network 108.

The email message 112 may then be displayed to a user 118-2 in a window pane (e.g., a reading pane) of a user interface 116-2 by an application 104-2 which, in this case, may be an email client application executing on the user device 102-2 or in a browser on the user device 102-2. The user interface 116-2 may be rendered on a display of the user device 102-2. The application 104-2 may use the linking parameters in the email message 112 to retrieve the content of the interactive component (and, in some cases, instructions for rendering the content or a path to such instructions) from the storage component 120 in the shared storage 106. The application 104-2 may then render the interactive component 114, including the retrieved content of the interactive component 114, in the window pane (e.g., the reading pane) of the user interface 116-2 within the email message 112. The user 118-2 may then update the content of the interactive component 114 within the email message 112 in the reading pane of the user interface 116-2 of the application 104-2. Changes to the content of the interactive component 114 made by the user 118-2 may be provided to the shared storage 106 so that content of the interactive component stored in the storage component 120 may be updated to reflect the changes. Thus, the changes may be propagated to renderings of the interactive component 114 that may be displayed, concurrently or at a later time, when the email message 112 is opened in other applications 104 (e.g., 104-1, 104-2, etc.). For example, if the user 110 later opens the email message 112 from a sent mail folder in the user interface 116-1 of the application 104-1, the interactive component 114 rendered within the message in the user interface 116-1 will reflect the changes to the content of the interactive component made by the user 118-2.

It should be appreciated that although the application 104-1 is generally described herein as being used by a sender to compose and send an email message having an embedded interactive component, and the application 104-2 is generally described herein as being used by a recipient to view the email message having the embedded interactive component, the applications 104 can generally be used to both compose and send email messages having embedded interactive components as well as to view received messages having embedded interactive components. The application 104-2 may generally be the same as or similar to the application 104-1, in an embodiment. Moreover, it should be appreciated that although examples herein are generally described with reference to a single interactive component being rendered, displayed and shared in an message, multiple interactive components may be rendered, displayed and shared in a same message, in some embodiments.

With continued reference to FIG. 1, the application 104-1 may be configured to display an icon 122 in the user interface 116-1 to allow the user 110 to create one or more interactive components for insertion into a message being composed in the user interface 116-1. The user 110 may, therefore, click on or otherwise engage with the icon 122 to initiate insertion of the interactive component 114 into the email message 112. In response to detecting that the user 110 has engaged with the icon 122, the application 104-1 may display a menu including a plurality of interactive component types that may be available for insertion into the email message 112. Examples of interactive component types include, but are not limited to, a bulleted list, a numbered list, a chart, a table, a text paragraph, an agenda, and the like. In some aspects, interactive component types may be created based on templates for each type. In response to receiving a selection of a particular interactive component type, the application 104-1 may initiate a process for creating the interactive component 114 based on the selected type.

Creating the interactive component 114 may include determining linking parameters to link the content of interactive component 114 to storage component 120 in the shared storage 106. The storage component 120 may be, for example, a file in a user drive that may be associated with the user 110 in the shared storage 106. Of course, the storage component 120 in the shared storage 106 may comprise any suitable structure other than a file in a user drive. In an embodiment, the application 104-1 may communicate with the shared storage 106 (e.g., via a server device, not illustrated in FIG. 1, which may be coupled to, or may include, the shared storage 106) to obtain linking parameters that may be used to link the content of interactive component 114 to the storage component 120 in the shared storage 106. The linking parameters may include, for example, one or more of: (i) an identifier of a user drive associated with the user 110 in the shared storage 106, (ii) an identifier of a folder on the user device, (iii) an identifier of a file in a folder on the user drive, (iv) an identifier of a file in a folder on the user device, etc. The application 104-1 may obtain the linking parameters from the shared storage 106 using information about the user, such as login information used to log into the application 104-1, for example. The application 104-1 may render the interactive component 114 within an email message 112 being composed in a window pane (which in this case may be a compose pane) in the user interface 116-1, and may link the interactive component 114 to the storage component 120 in the shared storage 106, using the linking parameters. Because the interactive component 114 is a newly created interactive component in this scenario, linking the interactive component 114 to the storage component 120 in the shared storage 106 may include creating the storage component 120 in the shared storage 106, and storing content of the interactive component 114 (and, in some cases, instructions for rendering the content or a path to such instructions) in the storage component 120. Prior to sending the email message 112, the application 104-1 may generate a link, such as a Uniform Resource Locator (URL) link, with the linking parameters included or encoded in the link, and may embed or encode the link into the email message 112.

In another example scenario, the interactive component 114 may be a previously created interactive component that the user 110 wishes to insert into the email message 112. For example, the application 104-1 may be configured to allow the user 110 to paste a previously created interactive component, or a portion of the previously created interactive component, into the user interface 116-1 displaying the email message 112 to cause the interactive component 114 to be inserted into the email message 112. Pasting the previously created interactive component, or a portion thereof, may comprise pasting a link, such as a Uniform Resource Locator (URL) link, that includes linking parameters for linking the interactive component 114 to content of the previously created interactive component (or the portion thereof) stored in the storage component 120. Thus, in response to detecting that the user 110 has pasted a link into the email message 112 in the user interface 116-1, the application 104-1 may parse the link to extract the linking parameters from, or otherwise determine the linking parameters based on, the link. In an embodiment, the application 104-1 may be configured to resolve the link to map the linking parameters to a path to the storage component 120. The application 104-1 may then retrieve the content of the previously created interactive component from the storage component 120 of shared storage 106 and may render previously created content in the rendering of the interactive component 114 within the email message 112 being composed in the user interface 116-1.

The user 110 may wish to send the email message 112 to the one or more users 118. Accordingly, the user 110 may, for example, press a "send" button or otherwise indicate to the application 104-1 that the user 110 wishes to send the email message 112. In response to receiving the indication that the user 110 wishes to send the email message 112, the application 104-1 may encode the email message 112 for transmission over the communication network 108. In some embodiments, the application 104-1 may be configured to provide that any intended recipients of the email message 112 are permissioned to access the storage component 120 that stores content of the interactive component 114. In an embodiment, the application 104-1 may be configured to ensure that any recipients listed on a "To" line of the email message 112 in the user interface 116-1 are permissioned to access the storage component 120 storing content of the interactive component 114.

Encoding the email message 112 may include embedding the linking parameters that link the interactive component 114 to content of the interactive component 114 stored in the storage component 120 into the email message 112. In an embodiment, when encoding the email message 112, the application 104-1 may (i) embed the linking parameters that link the interactive component 114 to the storage component 120 into the email message 112 and (ii) render the content of the interactive component 114 in the email message 112. In further aspects, the application 104-1 may embed the linking parameters that link the interactive component 114 to the storage component 120 and may present the link in an abbreviated or "beautified" format that communicates to a recipient information about the content of the interactive component 114 (e.g., a title or topic of the interactive component 114, e.g., "Action Items"). The application 104-1 may then cause the email message 112 to be sent to the one or more users 118 via the communication network 108. Additionally, the application 104-1 may cause a copy of the email message 112 to be saved, for example in a "sent mail folder" that may be accessible by the user 110 of application 104-1.

The email message 112 may be received by the user 118-2 via the application 104-2, and may be rendered and displayed to the user 118-2 in-line with static content (e.g., text) of the email message 112 in a window pane (e.g., reading pane) of user interface 116-2. In an embodiment, the application 104-2 may be configured to parse the email message 112 to determine whether an interactive component is embedded into the email message 112. Parsing the email message 112 may include, for example, looking for and resolving linking parameters in the email message 112. In the scenario illustrated in FIG. 1, because the email message 112 includes linking parameters for linking the interactive component 114 to the storage component 120, the application 104-2 may obtain the linking parameters from the email message 112. The application 104-2 may access the shared storage 106 using the linking parameters, and may obtain content of the interactive component 114 stored in the storage component 120 in the shared storage 106. The application 104-2 may render the obtained content of the interactive component 114 in the email message 112 within a window pane (e.g., reading pane of an inbox folder) in user interface 116-1.

With continued reference to FIG. 1, once the email message 112 is sent from the user 110 to the one or more users 118, the user 110 and the one or more users 118 may be able to interact with each other and collaborate on the content of the interactive component 114 from directly within the email message 112 displayed in respective reading panes of an inbox folder (e.g., for recipient user(s) 118) or a sent mail folder (e.g., for sender user 110), without exchanging additional messages and without navigating away from the user interfaces 116 of applications 104. For example, because renderings of the interactive component 114 displayed in-line with email message 112 in the respective user interfaces 116 are synchronized with the content of the interactive component 114 that is stored and maintained in the shared storage 106, changes made to the content of the interactive component 114 by any of the users 110, 118 are automatically reflected in renderings of the interactive component 114 that may be concurrently, or at a later time, displayed to any other ones of the users 110, 118 when viewing the email message 112 in respective users interfaces 116.

In some embodiments, the interactive component 114 may be rendered and displayed by an application 104 in a GUI element such as a frame, a pane, and the like (e.g., an iFrame) within the received or sent email message 112 in a window pane (e.g., a reading pane associated with an inbox or sent mail folder) of a respective user interfaces 116. For example, the interactive component 114 may be displayed in a GUI element in-line with static content (e.g., text) of the email message 112. In some embodiments, the applications 104 may be configured to render the interactive component 114 in a manner that visually distinguishes the interactive component 114 from the static content of the email message 112. For example, an application 104 may be configured to render interactive component 114 with a shaded background, an outline box and/or other visual cues that may signal to recipients of the email message 112 that the interactive component 114 includes interactive content that may be operated on directly within the interactive component 114 displayed in-line with the static content (e.g., text) of the email message 112.

In an embodiment, the application 104-1 may utilize an interactive component module 124 for rendering and displaying the interactive component 114 in the user interface 116-1. Although not illustrated in FIG. 1, other applications 104 may similarly utilize interactive component modules such as the interactive component module 124 for rendering and displaying the interactive component 114 in respective user interfaces 116. In an embodiment, the interactive component module 124 may comprise logic or instructions (e.g., code such as Java code, JavaScript code, C# code, C++ code, etc.) configured to render and run interactive components of the particular interactive component type corresponding to the interactive component 114. In an embodiment, interactive component module 124 may be included with the application 104-1. In another embodiment, the interactive component module 124 may be external to the application 104-1. For example, in some embodiments, the interactive component module 124 may reside on a server device and may be accessible by the application 104-1 via the communication network 108. The interactive component module 124 may be a first-party component created by or provided by a company associated with the application 104-1, or may be a third-party component created or provided by a company other than the company associated with the application 104-1, for example. In some embodiments, the application 104-1 may dynamically load the interactive component module 124 for rendering and running the interactive component 114 in the user interface 116-1.

In an embodiment, the application 104-1 may provide, as inputs to the interactive component module 124, various parameters for rendering the interactive component 114, such as a presence color to be used for rendering the interactive component 114, a list of buttons to be included in an "extend" menu of the interactive component 114, handlers for handling various events (e.g., various user inputs), and the like. The interactive component module 124 may then render and/or run the interactive component 114 in the user interface 116-1. If desired, the user 110 may edit the content of the interactive component 114 directly within an email message 112 being composed in the user interface 116-1. The application 104-1 may cause any changes made to the content of the interactive component 114 to be reflected in the storage component 120.

Referring still to FIG. 1, in an embodiment, at least one of the applications 104 (e.g., the application 104-4) does not support rendering and displaying interactive components embedded into messages. For example, the application 104-4 may be a legacy or a third-party application that does not support rendering and displaying interactive components embedded into messages. In an embodiment, the application 104-1 may be configured to encode the email message 112 in a manner that allows email client applications that do not support rendering of interactive content to still display useful information associated with the interactive component 114. For example, encoding the email message 112 may include inserting the linking parameters into the email message 112 in a format that may be displayed as a link or an icon in the user interface 116-4 of the application 104-4. The user 118-4 may click or otherwise engage with the link or an icon in the user interface 116-4 of the application 104-4 to navigate away from the application 104-4 to display the interactive component 114 in another application, separate from the application 104-4, that may support rendering and display of interactive components. The user 118-4 may then be able to interact and collaborate on the content of the interactive component 114 with the user 110 and/or the other users 118 via the rendering of the interactive component 114 in a user interface of the other application.

Additionally or alternatively, the application 104-1 may be configured to encode the email message 112 to include a static representation of the content of the interactive component 114 in the email message 112 to allow the application 104-4 to display the static representation of the content of the interactive component 114 in the user interface 116-4 when the email message 112 is displayed. In an embodiment, the static representation of the content of the interactive component 114 displayed in the user interface 116-4 may enable user 118-4 to reply to the email message 112 with updates to the static representation of interactive component 114, similar to current messaging scenarios. In another embodiment, the static representation of the content of the interactive component 114 displayed in the user interface 116-4 may be configured to serve as a link that, when clicked or otherwise engaged with by the user 118-4, may cause the user 118-4 to navigate away from the application 104-4 to display the interactive component 114 in another application, separate from the application 104-4, that may support rendering and display of interactive components. The user 118-4 may then be able to interact and collaborate on the content of the interactive component 114 with the user 110 and/or the other users 118 via the rendering of the interactive component 114 in a user interface of the other application.

Figure 2:
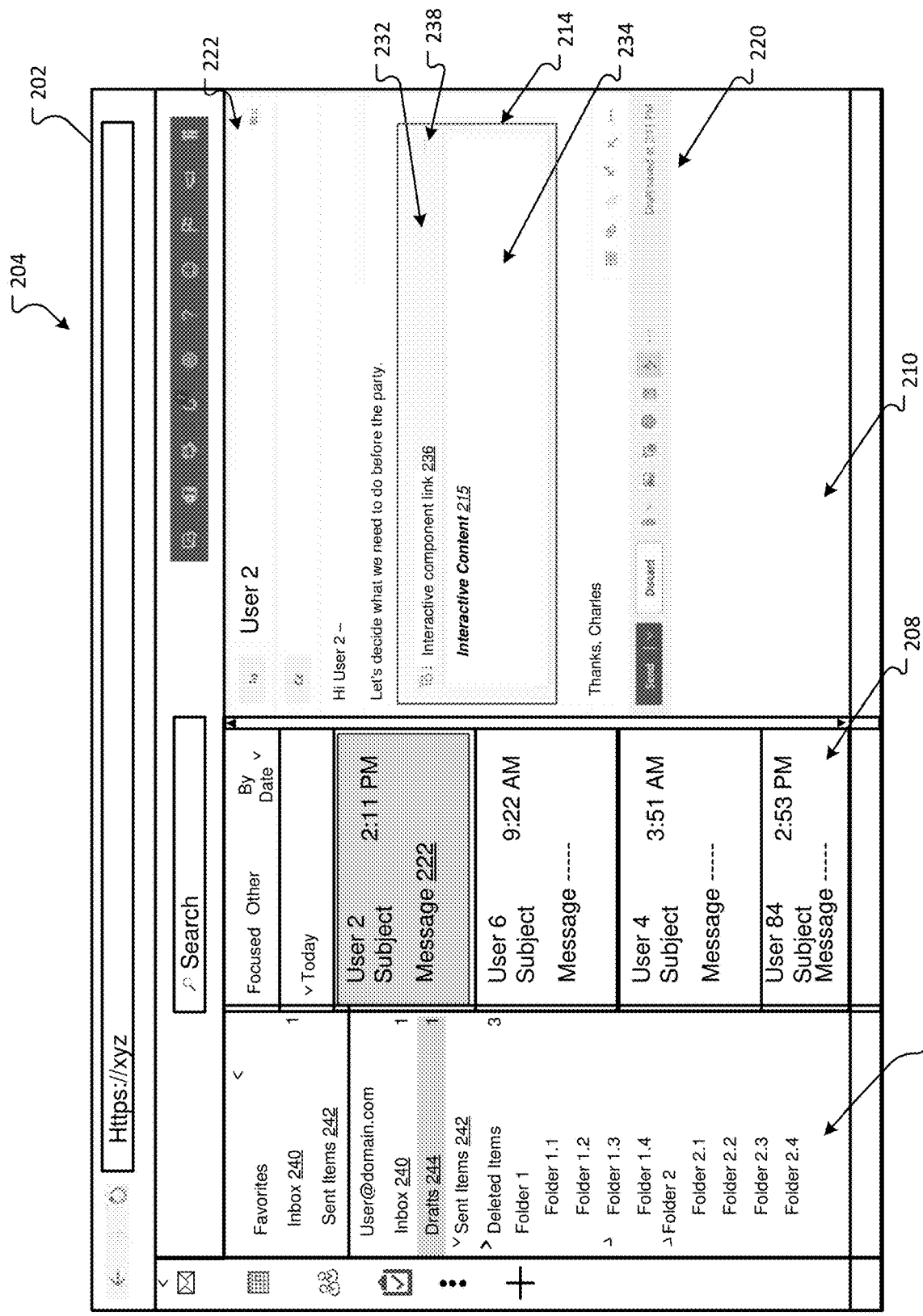
FIG. 2 depicts an interactive component rendered within a message displayed in a window pane of a messaging application user interface, in accordance with examples of the present disclosure.

Turning now to FIG. 2, an interactive component 214 is depicted as being rendered in a reading pane 220 of a user interface 202 of an application 204, in accordance with examples of the present disclosure. In an embodiment, the application 204 may correspond to an application 104 of the system 100 of FIG. 1. The interactive component 214 may correspond to the interactive component 114 of FIG. 1. In another embodiment, the application 204 and/or the interactive component 214 may be utilized in a system different from the system 100 of FIG. 1. The application 204 is an email client application, in the illustrated embodiment. However, the application 204 may be another type of application, such as a chat application, a meeting application, a document view application, or any other suitable type of application, in other embodiments.

The user interface 202 of the application 204 may include a plurality of window panes, including a navigation pane 205 configured to navigate between folders associated with messages, such as an inbox folder 240 or a sent items folder 242. As further illustrated by FIG. 2, the folder and/or label, such as but not limited to inbox folder 240 and sent items folder 242, may correspond to favorite items such that a user may quickly access messages from and/or view summary information associated with one or more of the folders or labels. Similarly, the user interface 202 of the application 204 may include a list pane 208 configured to provide a listing of messages contained in a folder or otherwise associated with a label. The folder and/or label depicted in FIG. 2 associated with the messages displayed in the list pane 208 may correspond to a selected folder such as but not limited to selected drafts folder 244 (shaded to indicate selection). The user interface 202 of the application 204 may also include a reading pane 210 configured to provide display of an email message 222 selected within the list pane 208 (shaded to indicate selection) associated with a drafts folder 244 selected in the navigation pane 205. As depicted in FIG. 2, the message displayed in reading pane 210 corresponds to an email message (e.g., email message 222); however, a message displayed in a window pane may correspond to other types of messages, such as instant message, chat messages, text messages, etc., in other embodiments. As illustrated, the email message 222 is provided in a compose pane 220 associated with reading pane 210. In other embodiments, compose pane 220 may be provided in a separate window (e.g., overlaying the other panes of user interface 202). As illustrated, email message 222 is being composed by a user of the application 204 in compose pane 220 of reading pane 210.

As depicted in FIG. 2, the interactive component 214 may be rendered and displayed within email message 222 being displayed in the compose pane 220. The interactive component 214 may be rendered for example, in a GUI element, a frame, a pane, etc., within the email message 222, in an embodiment. The interactive component 214 may be a new interactive component created for insertion into the email message 222 or may be a previously created interactive component, or a portion thereof, that may be inserted into (e.g. pasted into) the email message 222. In another example, the email message 222 may be a received email message (not shown), and the interactive component 214 may be rendered and displayed within the received email message. The interactive component 214 may include a header portion 232 and a body portion 234. The header portion 232 may display a link 236 that contains linking parameters for linking the interactive component 214 to a storage component (e.g., the storage component 120) in a shared storage (e.g., the shared storage 106) that may store and maintain interactive content 215 of the interactive component 214. The link 236 may be a uniform resource locator (URL) link, for example, or may be a suitable link (or pointer) different from a URL link. In some embodiments, the link 236 may be a beautified link, such as a human readable link. By clicking or otherwise engaging with the link 236, a user may navigate away from the application 204 to launch an application other than the application 204 and to cause the interactive component 214 to be rendered and displayed in a user interface of the other application to allow a user to edit the interactive component 214 via the user interface of the other application.

The header portion 232 of the interactive component 214 may also include an extend menu button 238. Clicking or otherwise engaging with the extend menu button 238 may cause the interactive component 214 to display an "extend" menu containing selectable options of operations that may be performed with respect to the interactive component 214. For example, the extend menu may include one or more of (i) a copy operation that may allow a user to copy the interactive component 214, for example, for pasting the interactive component 214 into another email message (e.g., a new email message) being composed in the application 204 or into a user interface of an application external to the application 204, (ii) a delete operation that may allow the user to remove the interactive component 214 from the email message 222 displayed in the compose pane 220, and/or (iii) a permissions operation that may allow the user to change permissions for accessing a storage component storing interactive content 215 of the interactive component 214. Interactive content 215 of the interactive component 214 may be rendered in the body portion 234 of the interactive component 214. For example, interactive content 215 of the interactive component 214 may include a bulleted list, a numbered list, a chart, a table, a text paragraph, an agenda, etc., that may be editable directly in the interactive component 214 within email message 222. As detailed above, interactive content 215 rendered in the body portion 234 of the interactive component 214 may be obtained from a storage component in shared storage (e.g., shared storage 106) and may be synchronized when rendering interactive content 215 of the interactive component 214.

In some scenarios, an interactive component may be rendered and displayed within an email message in a reading pane of a user interface of an application that may also include static content such as text that may be entered by a user directly into the email message within a compose pane displayed by the user interface. In such scenarios, the interactive component may be displayed "in-line" with the static content, such as above the static content, below the static content, or between portions of the static content within email message.

Figure 3:
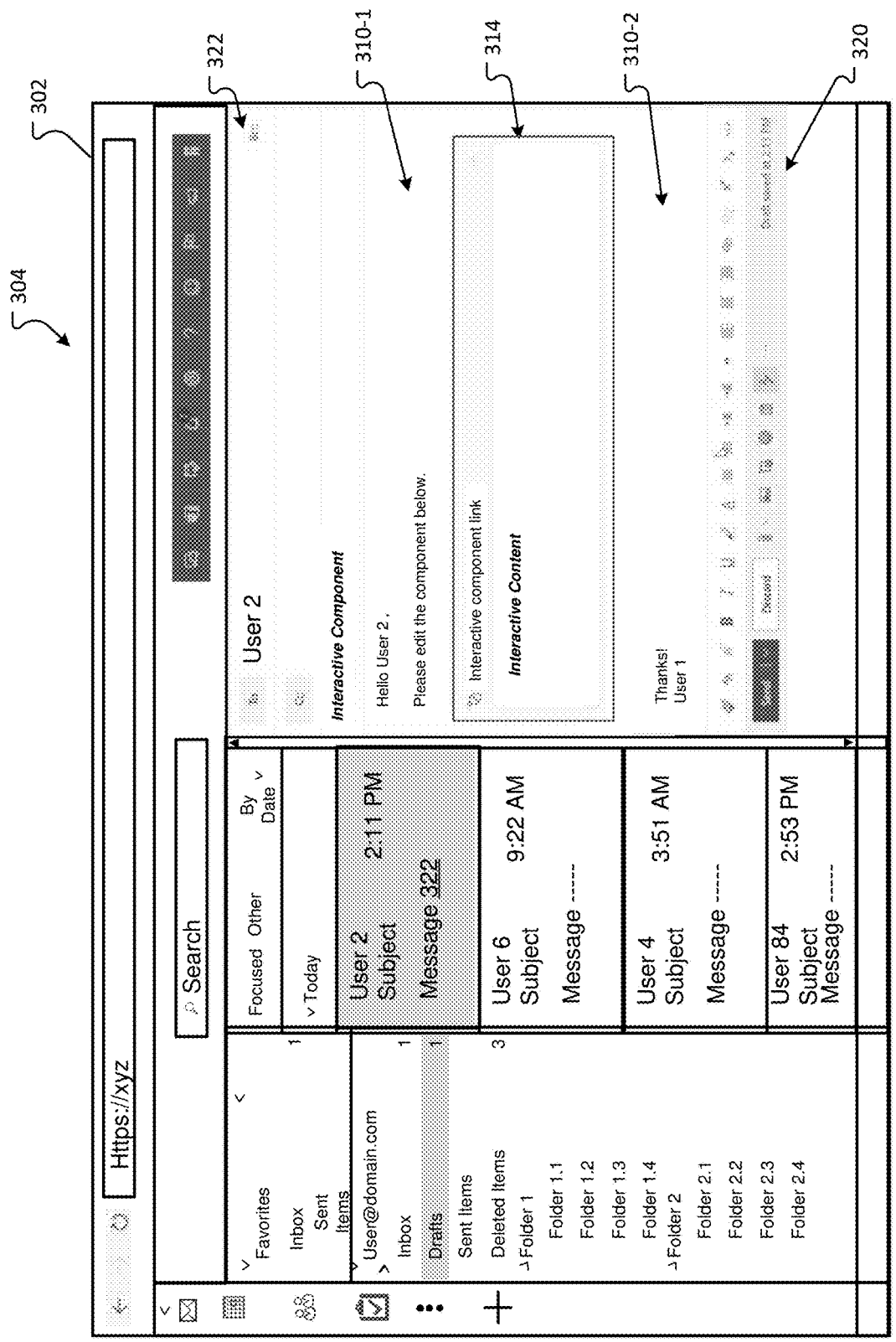
FIG. 3 depicts an interactive component rendered a window pane of a user interface of a messaging application in-line with static content of a message displayed by the messaging application, in accordance with examples of the present disclosure.

FIG. 3 depicts an interactive component 314 rendered a compose pane 320 of a user interface 302 of an application 304, in accordance with examples of the present disclosure. The application 304 depicted in FIG. 3 may be the same as or similar to the application 204 depicted in FIG. 1, in an embodiment. The interactive component 314 depicted in FIG. 3 may be the same as or similar to the interactive component 214 of FIG. 2, in an embodiment. The interactive component 314 may be positioned between static portions (e.g., 310-1 and 310-2) of static content 310 of an email message 322 displayed in the compose pane 320 of the user interface 302, in the illustrated embodiment. More generally, the interactive component 314 may be positioned in any location within a body of email message 322, for example below static content 310, above static content 310, between portions of static content 310, etc. A user may select a position for creating and embedding the interactive component 314 in the email message 322, for example, by clicking on a desired location and/or placing a cursor in a desired location within email message 322. In other examples, the user may select the desired location for pasting the interactive component 314 (e.g., a previously created interactive component) into the email message 322. In an embodiment, the linking parameters for rendering the interactive component 314 in a received message (e.g., in a reading pane associated with an inbox of a recipient) may be encoded at a particular location in a representation (e.g., Hypertext Markup Language (HTML) representation) of the email message 322 to cause the interactive component 314 to be rendered at the corresponding location when the email message 322 is received by recipient's messaging application. The interactive component 314 may be formatted according to a scheme that distinguishes the interactive component 314 from the static content 310 of the email message 322. For example, the interactive component 314 may include a shaded background or outline box to distinguish the interactive component 314 from what otherwise may be static text or white background of the body of email message 322.

Figure 4:
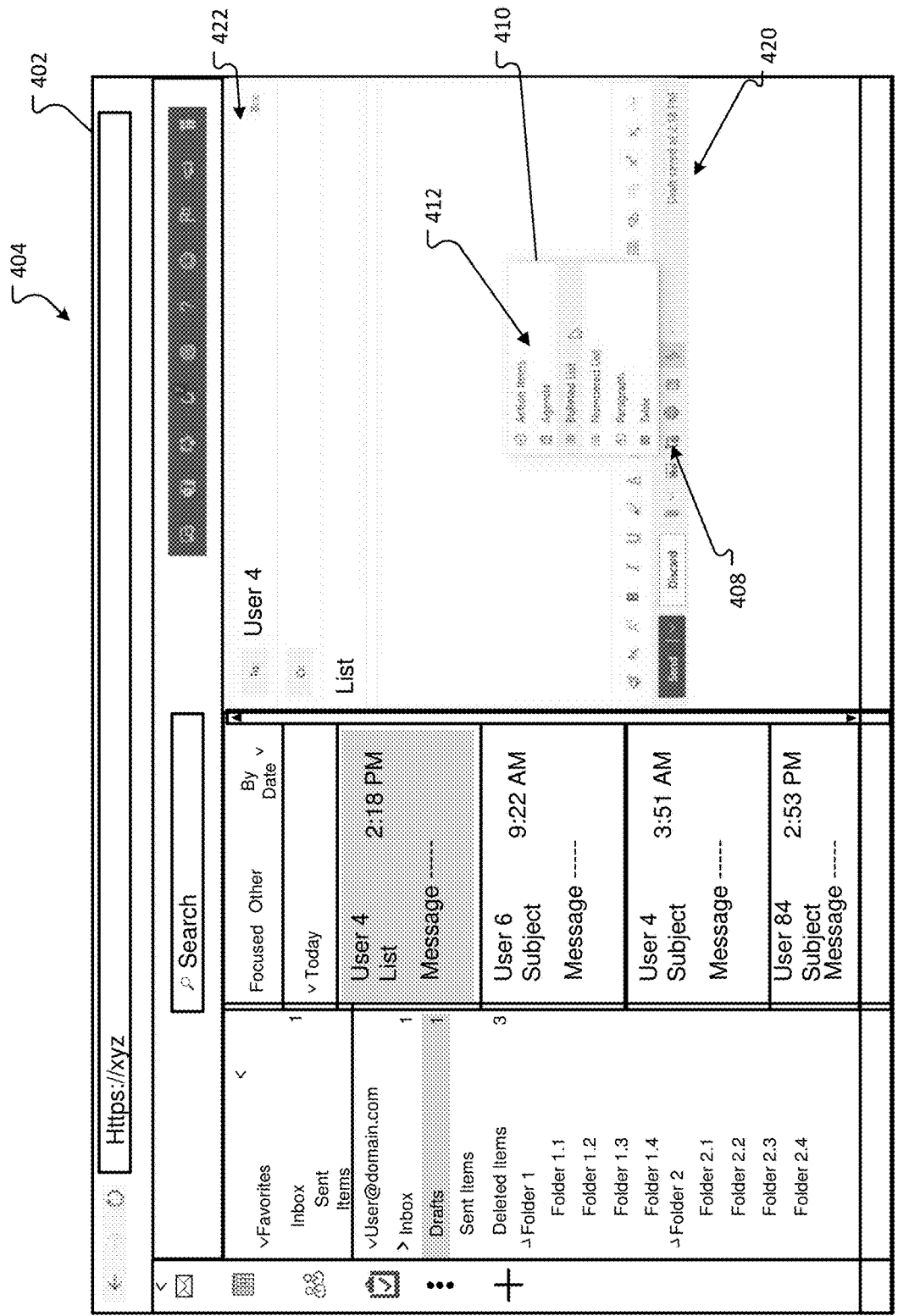
FIG. 4 depicts a menu for insertion of an interactive component into a message being composed in a window pane of a user interface of a messaging application, in accordance with examples of the present disclosure.

FIG. 4 depicts a user interface 402 of an application 404 in accordance with examples of the present disclosure. The application 404 depicted in FIG. 4 may be the same as or similar to the application 104-1 depicted in FIG. 1, in an embodiment. The user interface 402 may display an interactive component icon 408 that may allow a user to create a new interactive component to be inserted into an email message directly from within a compose pane 420 of user interface 402. When a user wishes to insert a new interactive component in an email message 422 being composed in a compose pane 420, the user may click on, or otherwise engage with, the interactive component icon 408 to cause an interactive component menu 410 to be displayed to the user. The interactive component menu 410 may display one or more predetermined interactive component types 412 that may be available for selection by the user. The interactive component types 412 displayed in the interactive component menu 410 many include action items, agenda, bulleted list, numbered list, paragraph, and table, as illustrated in FIG. 4. In other embodiments, the interactive component menu 410 may display a greater number or fewer interactive component types 412 than depicted in FIG. 4 and/or may include one or more different interactive component types than the interactive component types 412 depicted in FIG. 4. The user may click on a desired location in the email message 422 within compose pane 420 to initiate insertion of an interactive component of the selected interactive component type into the email message 422.

Figure 5:
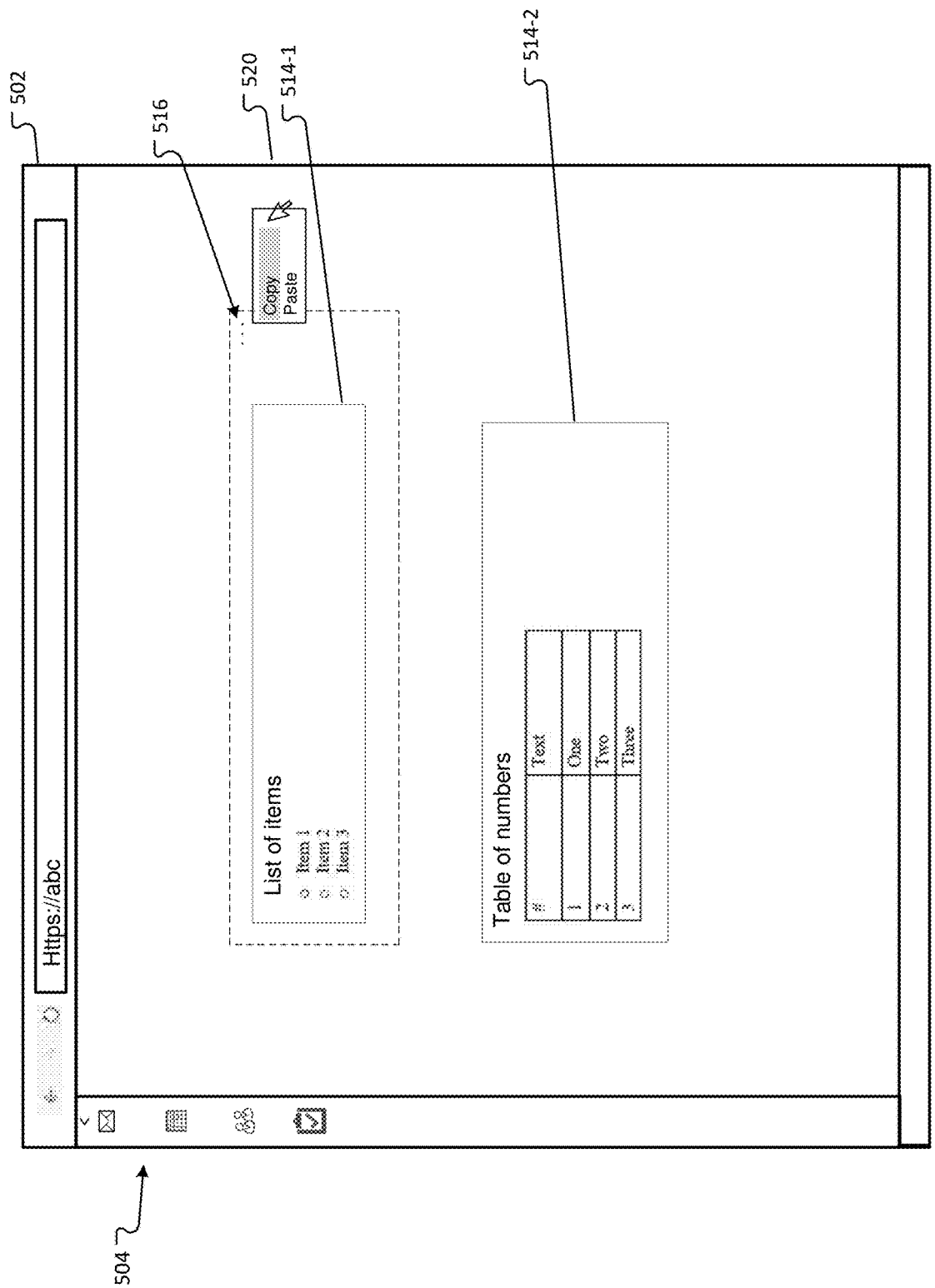
FIG. 5 depicts an interactive component being copied for insertion into a message being composed in a window pane of a user interface of a messaging application, in accordance with examples of the present disclosure.

FIG. 5 depicts an interactive component being copied from a user interface 502 of an application 504 in accordance with examples of the present disclosure. A user composing an email message in a messaging application (e.g., applications 204 and/or 304) may wish to paste and interactive component that may be viewed by the user in the user interface 502 of the application 504. The application 504 may be an application other than a messaging application. For example, the application 504 may be an interactive canvas application that may be configured to render, display and run interactive components. In another embodiment, the application 504 may be a messaging application. For example, the user may copy an interactive component from an email message in a messaging application into application 504 that may be viewed by the user in the user interface 502; alternatively, the user may copy an interactive component (e.g., a previously created interactive component) associated with application 504 into an email message associated with a messaging application.

The user interface 502 of the application 504 is illustrated in FIG. 5 as depicting several previously created interactive components 514 (e.g., previously created interactive components 514-1 and 514-2), in the illustrated embodiment. A user composing an email message may wish to paste an interactive component 514 into the email message. The user may copy the interactive component 514-1, for example, by clicking on or otherwise engaging with an extend menu button 516 of the interactive component 514-1 and selecting "copy" from an extend menu 520 that may be displayed to the user. In response to detecting that the user has selected "copy" from extend menu 520, the application 504 may generate a link including linking parameters to a storage component in which content of the interactive component 514-1 may be stored and maintained. The user may paste the interactive component 514-1 into the email message being composed in a messaging application by pasting the link into the email message in the messaging application.

In some embodiments, the user may wish to paste only a portion of a previously created interactive component into an email message. For example, the user may wish to paste only the first two items in the interactive component 514-1 or last two rows in the interactive component 514-2 into the email message. In this case, the user may select only the desired portion of the interactive component 514, and the application 504 may generate a link including linking parameters identifying the selected portion of the interactive component 514 that is stored and maintained in a storage component. In this case, when the user pastes the copied interactive component 514 into the email message, only the selected portion of the content of the interactive component 514 is rendered.

Figure 6A:
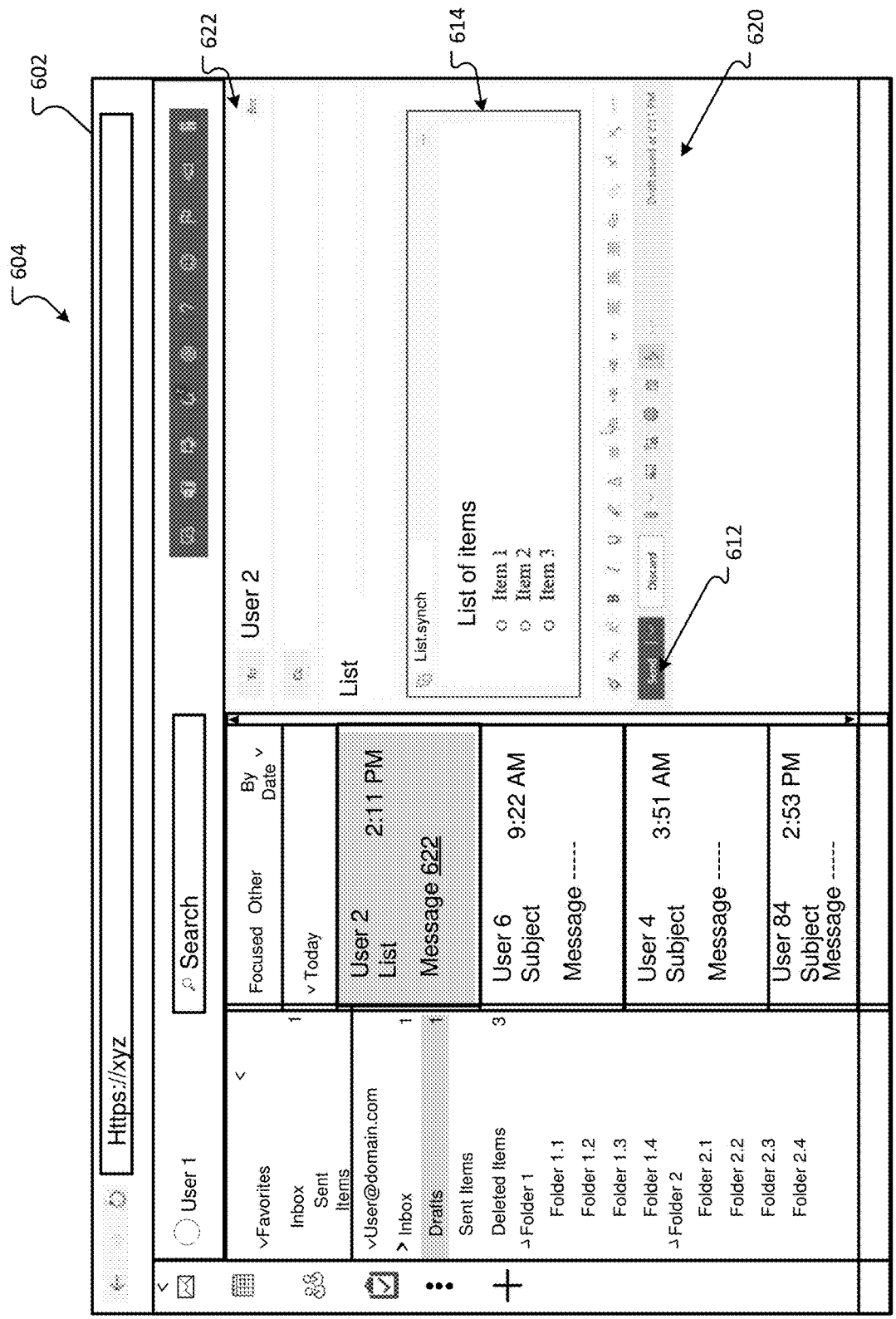
FIGS. 6A-6C depicts details of user interfaces associated with collaborating on interactive content in a message shared between messaging applications, in accordance with examples of the present disclosure.

FIG. 6A depicts a user interface 602 of a messaging application 604 in accordance with examples of the present disclosure. The messaging application 604 depicted in FIG. 6 may be the same as or similar to the application 204 depicted in FIG. 2, in an embodiment. The user interface 602 is illustrated in FIG. 6 as having an interactive component 614 rendered in an email message 622 being composed in a compose pane 620. The interactive component 614 may be the same as or similar to the interactive component 114 of FIG. 1. The interactive component 614 may be a new interactive component created for insertion into the email message 622 or may be a previously created interactive component, or a portion thereof, that may be inserted into (e.g. pasted into) the email message 622. For exemplary purposes, the interactive component 614 is illustrated as being a list of items type. Accordingly, the content of the interactive component 614 is a list of items, in the illustrated embodiment. The email message 622 may be composed by a User 1 and, as illustrated in a "To" line in the email message 622, may be intended for a User 2.

User 1 may click or otherwise engage with a send button 612 to send the email message 622 to the User 2. Accordingly, the messaging application 604 may cause the email message 622 to be sent to User 2. Before sending the email message 622, the messaging application 604 may embed or encode into the email message 622 a link that includes linking parameters for linking the interactive component 614 to a storage component (e.g., in the shared storage 106) that may store content of the interactive component 614. Additionally, the messaging application 604 may check whether recipients listed in the "To" line (in this case User 2) are permissioned to access the storage component storing content of the interactive component 614 and, if not, cause permissions to be updated so that all intended recipients of the email message 622 are permissioned to access the storage component.

Figure 6B:
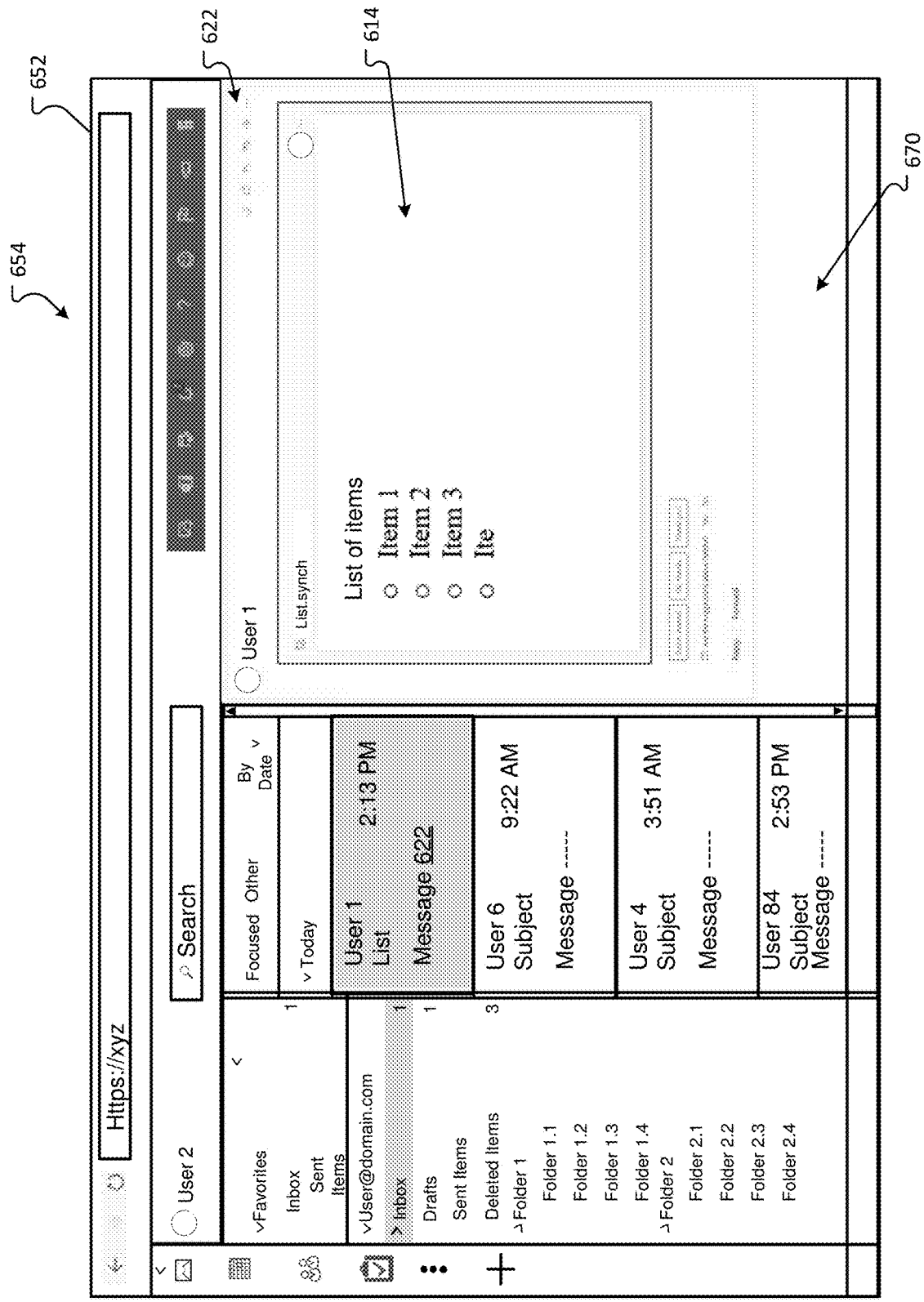

Referring now to FIG. 6B, an example embodiment of a user interface 652 of a messaging application 654 being used to view the email message 622 by a recipient of the email message 622 (User 2) is illustrated. The messaging application 654 may be the same as or may be different from the messaging application 604 that was used to compose the email message 622. The messaging application 654 may be configured to render and display the interactive component 614 within email message 622 in a reading pane 670 using linking parameters that may be encoded into the email message 622. The messaging application 654 may retrieve the content of the interactive component 614 from the storage component (e.g., in the shared storage 106) and may render the content in the interactive component 614 within the email message 622. When rendered, the content of the interactive component 614 may correspond to the content of the interactive component 614 when the email message 622 was composed and sent by the User 1, for example. The User 2 may then edit the content of the interactive component 614. For example, as illustrated in FIG. 6B, User 2 may begin typing into the interactive component 614 rendered in the email message 622 to add an additional item to the items list in the interactive component 614.

Figure 6C:
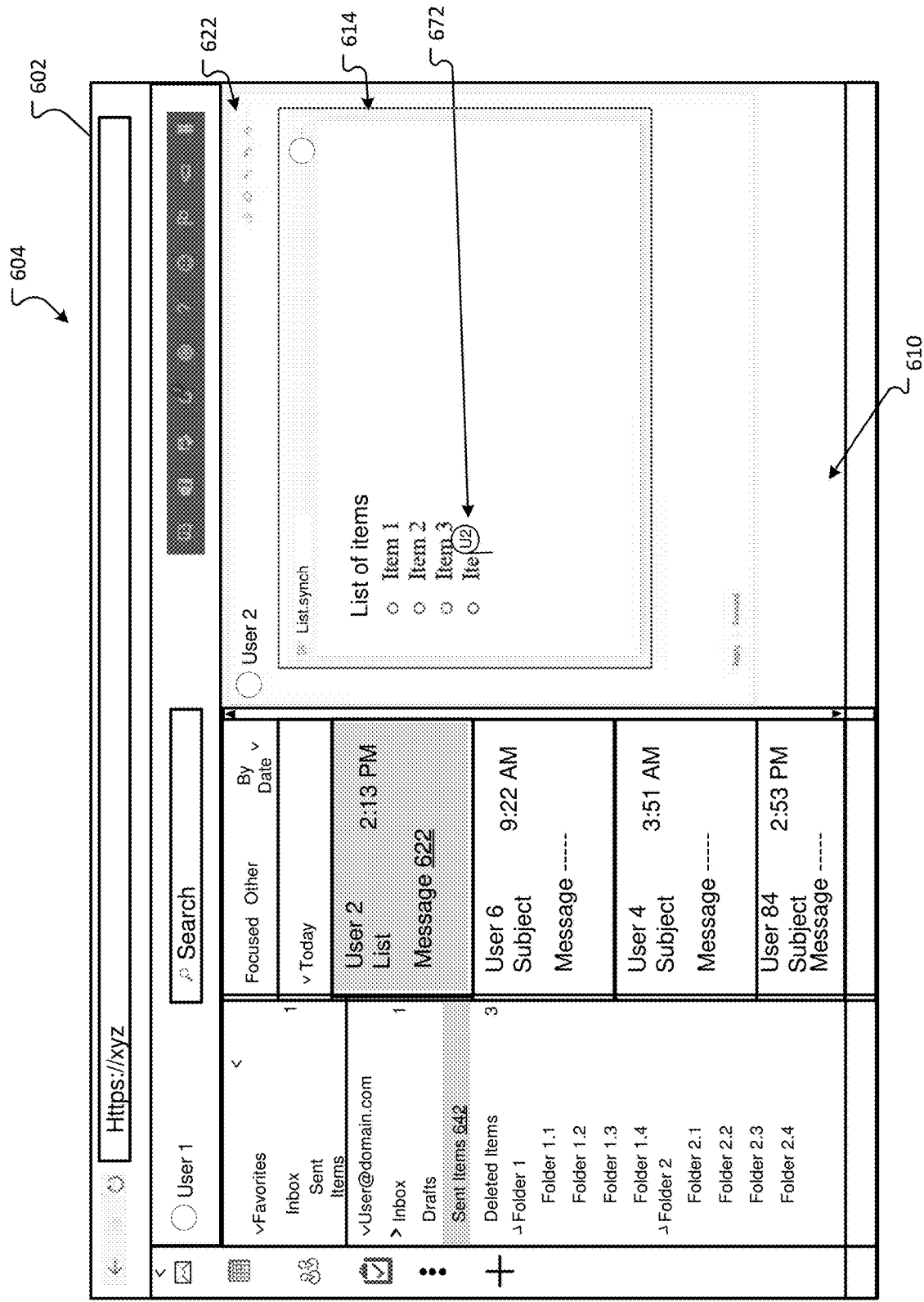

Referring now to FIG. 6C, concurrently with the changes to the content of the interactive component 614 being made by User 2 in the email message 622 displayed by the user interface 652, the email message 622 may also be displayed to the sender of the email message (User 1) in a reading pane 610 associated with sent items folder 642 in the user interface 602 of the messaging application 604. As illustrated in FIG. 6C, changes being made by User 2 may be displayed, in real time, in the rendering of the interactive component 614 in email message 622 displayed in reading pane 610 of the user interface 602 to User 1. The interactive component 614 is further configured to provide an indicator (e.g., display initials or a picture) of the User 2 to indicate that User 2 is making changes to the content of interactive component 614, in an embodiment.

Figure 7:
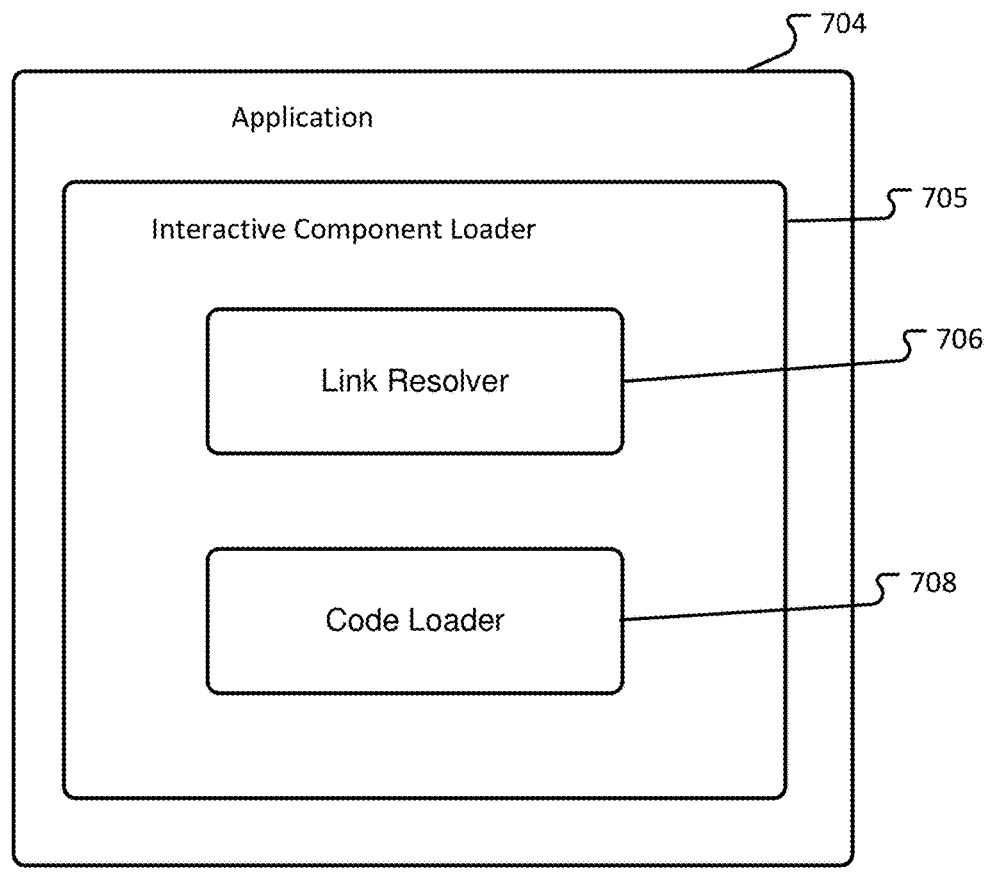
FIG. 7 is a block diagram depicting a messaging application configured to render interactive components in a user interface of the messaging application, in accordance with examples of the present disclosure.

FIG. 7 is a block diagram of an application 704 configured to render interactive components in accordance with an embodiment of the present disclosure. The application 704 corresponds to the application 104-1 of FIG. 1, in an embodiment. The application 704 may include an interactive component loader 705 having a link resolver 706 and a code loader 708. The link resolver 706 may be configured to parse received information associated with messages, such as interactive component information, to attempt to find any linking parameters that may be embedded into the received messages. For example, the link resolver 706 may attempt resolve the received information that may map to a link that includes linking parameters (e.g. 'nay' parameters). If the link resolver 706 is successful in finding linking parameters, this may indicate that an interactive component is to be rendered within the message.

In response to determining that the received information includes a link with a 'nay' parameter, and resolving the 'nay' parameter to a path to a storage component in shared storage (e.g., shared storage 106), the link resolver 706 may obtain the linking parameters from, or otherwise determine the linking parameters based on, the 'nay' parameter. The linking parameters obtained from the 'nay' parameter may include one or more of (i) an identifier of a user drive associated with the user in the shared storage, (ii) an identifier of a folder on the user device, (iii) an identifier of a file in a folder on the user drive, (iv) an identifier of a file in a folder on the user device, etc. The 'nay' parameter obtained from the link may additionally include information including instructions for rendering and running the interactive component, such as an identifier of a type of the associated interactive component, an identifier of, or a pointer to, instructions for rendering and running the interactive component, and the like.

The link resolver 706 may provide the extracted linking parameters to the code loader 708. In some embodiments, one or more additional inputs may be provided to the code loader 708 by the application 704. For example, information for rendering an interactive component, such as a presence color to be used for rendering the interactive component, a list of buttons to be included in an "extend" menu of the interactive component, handlers for handling various events (e.g., various user inputs), and the like, may be provided. In some embodiments, permissions and/or security information may be provided by the application 704 to the code loader 708. For example, one or more security tokens that may be needed by the code loader 708, for example, for accessing the shared storage on behalf of the user of the application 704 may be obtained by the interactive component loader 705 and provided to the code loader 708.

The code loader 708 may use the linking parameters to locate and obtain content of the interactive component and to load instructions for rendering the interactive component. For example, the code loader 708 may access a storage component identified by the linking parameters and may obtain, from the storage component, at least the content of the interactive component. In some embodiments, additional information for rendering and/or running the interactive component, such as instructions (e.g., logic) for rendering and/or running the interactive component and/or a link (e.g., a pointer) to such instructions may be stored along with the content (or in some manner encoded into the content) in the storage component. In an embodiment, the code loader 708 may be configured to obtain such additional information from the storage component, and may further obtain, based on the link or the pointer included with the content, instructions (e.g., logic) for running the interactive component. For example, the code loader 708 may obtain or communicate with the interactive component module 124 of FIG. 1 or a similar module for running the interactive component.

Figure 8:
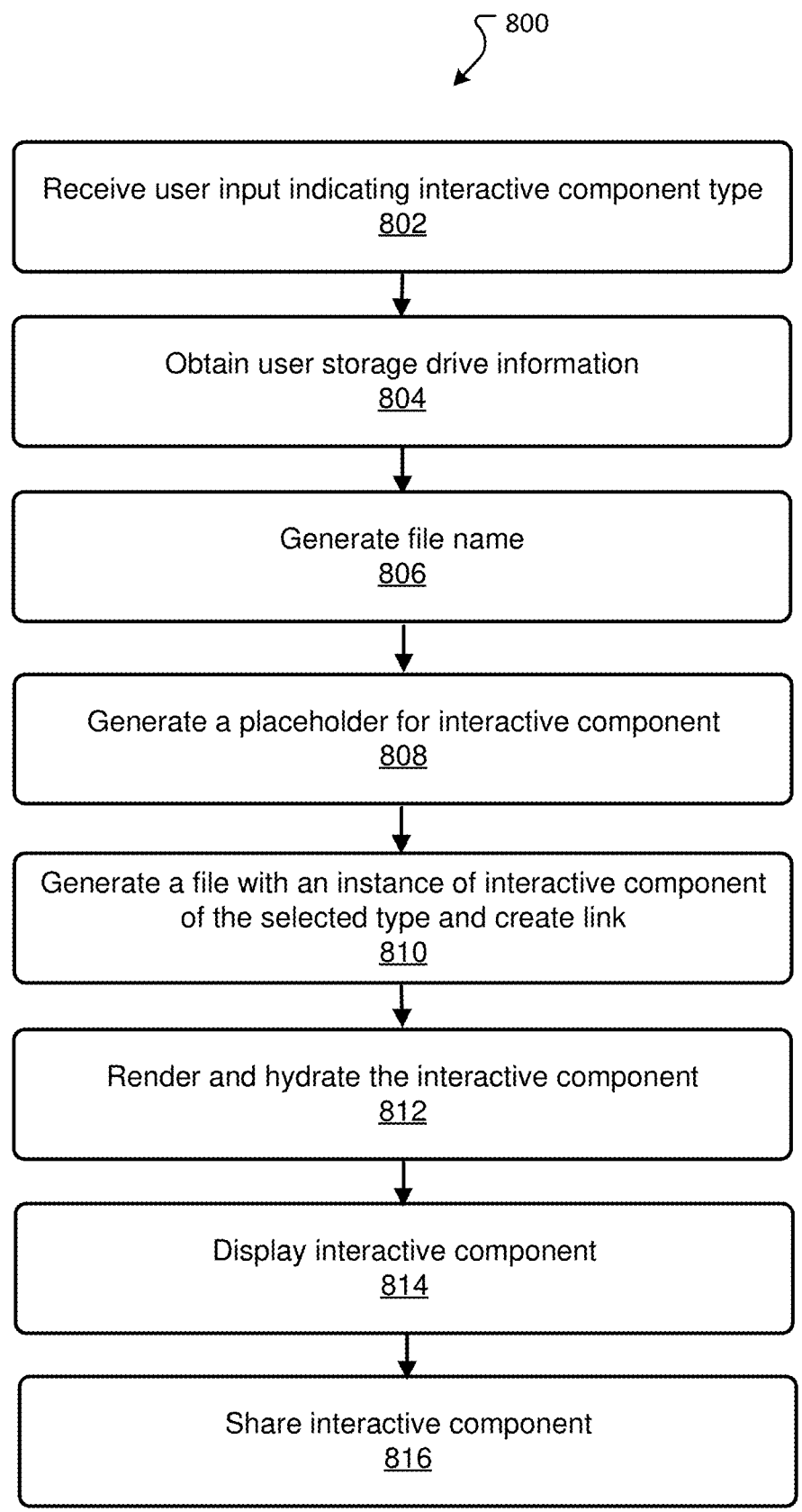
FIG. 8 depicts details of a method for inserting an interactive component into a message in accordance with an embodiment of the present disclosure.

FIG. 8 depicts details of a method for inserting an interactive component into an email message in response to a user selection in accordance with an embodiment of the present disclosure. A general order for the steps of the method 800 is shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7.

At block 802, a user input indicating an interactive component type is received by an application. The user input may signal to the application that an interactive component is to be inserted into a message of an application. For example, in an embodiment in which the application is a messaging application, such as an email application, the user input may signal that an interactive component is to be inserted into an email message being composed in a compose pane of a user interface of the email application. In an embodiment, the user input corresponds to a selection made by the user from a menu, the menu displaying a plurality of predetermined user component types. The menu may be displayed to the user when the user clicks on, hovers over, or otherwise engages with an icon that may be displayed in the user interface of the application. In other embodiments, the user input may be provided in other suitable manners.

At block 804, in response to receiving the user input at block 802, storage component identification (e.g., user drive information) is obtained by the application. Obtaining the storage component identification at block 804 may include obtaining an indicator of a user default folder in a user drive associated with the user in shared storage (e.g., the shared storage 106). For example, the application may send a request to an application server (e.g., an email server), and, in response, may receive the indicator of the user default folder from the application server. Obtaining storage component identification at block 804 may additionally include obtaining a user drive identifier (user drive ID) that may uniquely identify a user drive associated with the user in the shared storage. For example, the application may send a user drive ID request to a storage server, and, in response, may receive the user drive ID from the storage server. In other embodiments, other suitable user drive information is obtained by the application in other suitable manners.

At block 806, a file name is generated. The file name may be automatically generated based on information provided to the application. For example, the file name may be generated based on text entered into a subject line of the email message into which the interactive component is to be inserted by the application. In other embodiments, the file name may be generated is other suitable manners. For example, the application may prompt the user to enter a desired file name.

At block 808, a placeholder may be generated and placed in an application editor being used to define the user interface of the application. As an example, an empty div tag (<div/>) or an empty iframe tag (<iframe/>) may be placed in an application editor at the location at which the interactive component is to be inserted.

At block 810, a storage component (e.g., a file) including an interactive component of the selected type may be generated. The file may be stored in user folder in the user drive identified by the user drive information obtained at block 804. Generating the file at block 810 may include generating a link that includes linking parameters for linking the interactive component in the file with a rendering of the interactive component in the message being composed in the user interface of the application. For example, a link (e.g., a URL) may be generated, the link including navigation information that points to the file in the user folder on the user drive.

At block 812, a rendering of the interactive component is generated, and the rendering is hydrated with the content of the interactive component in the file in the user drive. Generating and hydrating the rendering of the interactive component may involve populating the placeholder generated at block 808 with content and/or logic needed to render and run the interactive component in the window pane of the application. Generating the rendering of the interactive component may include generating the rendering to include a display of the link to the to the file in user folder on the user drive. In an embodiment, the link may be beautified (e.g., in a human readable format) and the beautified link may be displayed.

At block 814, the rendering of the interactive component is displayed in the message being composed in the window pane of the user interface. A user may then update content of the interactive component directly in the message being composed. The updates made by the user may be synched, in real time, with the content of the interactive component that is stored in the file in the user drive such that the content of the interactive component stored in the file is updated and remains in synch with the interactive component rendered in the message by the application.

At block 816, the interactive component may be shared with one or more users. For example, a message (e.g., the email message into which the interactive component is inserted) may be sent to recipient users. The interactive component may be rendered in the message to the recipient users based on the linking parameters that link to (e.g., via path information that points to) the interactive component in the file in the user drive of the sending user. Such linking parameters may be encoded into the email message (e.g., into html representation of the email message). Additionally, permissions for accessing the file in the user drive may be set to allow the one or more recipient users to access the file in the user drive.

Following the message being shared (e.g., sent) by the sending user, the shared interactive component may subsequently be rendered and displayed to the one or more recipient users in respective user interfaces of the recipient's messaging applications. The message may also be saved in the sender's messaging application (e.g., placed in a sent items folder), and may subsequently be re-rendered and displayed, with the interactive component, in the user interface associated with the sender's messaging application. Because the interactive components rendered at the multiple applications are all synchronized with the content of the interactive component in the shared storage, the interactive components allow collaboration on content in the interactive component directly within the message via the respective user interfaces of the multiple applications. Continuous synchronizing of the interactive components rendered and displayed by the multiple applications may be implemented to ensure that updates to the content caused by respective users is continually shared among the multiple applications and continually (e.g., in real-time) displayed to users of the multiple applications.

Figure 9:
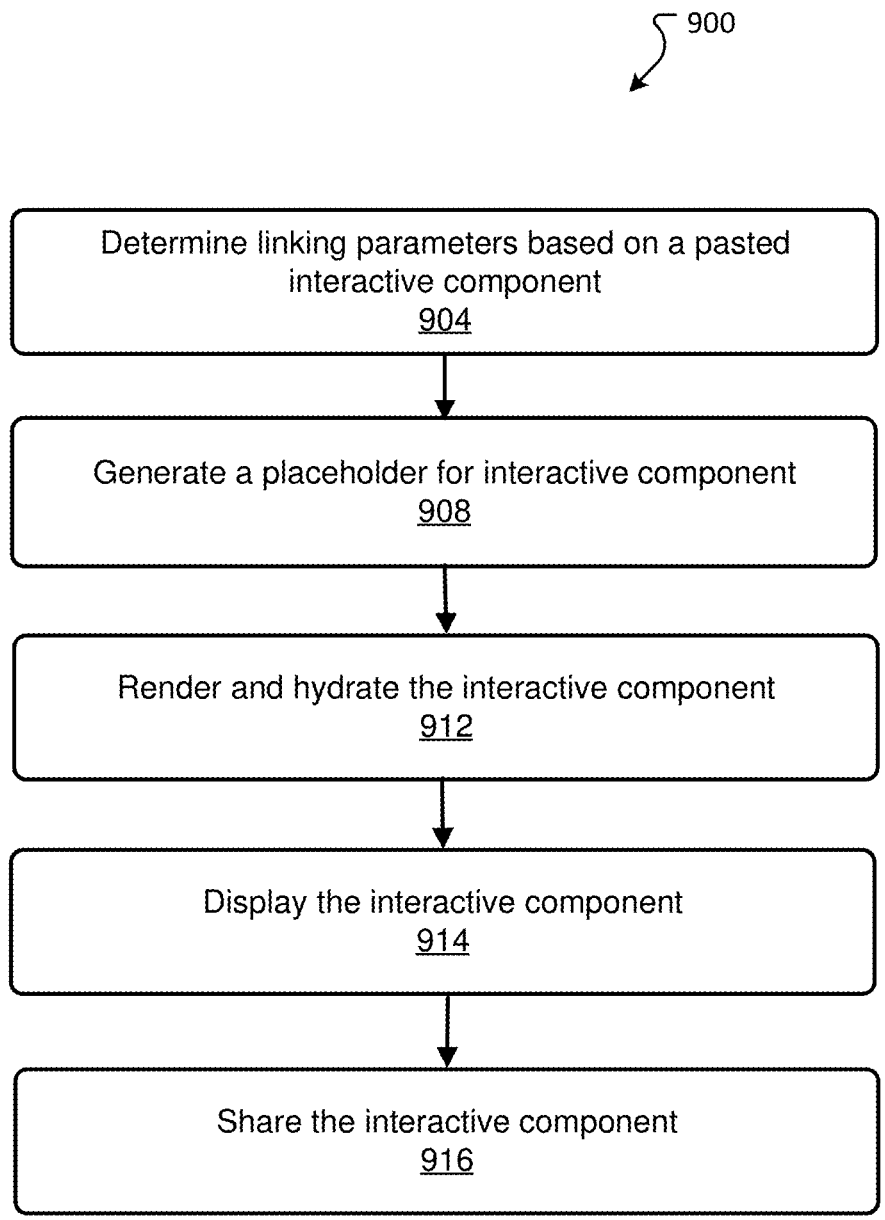
FIG. 9 depicts details of a method for inserting an interactive component into a message in accordance with another embodiment of the present disclosure.

FIG. 9 depicts details of a method for inserting an interactive component into a message in a compose pane of a user interface of an application in response to content being pasted into the message in accordance with an embodiment of the present disclosure. A general order for the steps of the method 900 is shown in FIG. 9. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1-8.

The method 900 is generally similar to the method 800 of FIG. 8 and includes like-numbered blocks with the method 800 of FIG. 8. However, whereas in the method 800, a new interactive component is created and rendered in a message in a window pane of a user interface of an application, in the method 900 retrieves a previously created interactive component to be pasted into the message in a window pane of the user interface of the application.

The method 900 includes a block 904, at which linking parameters are extracted or otherwise obtained from an interactive component pasted into the message. The interactive component (or a portion of an interactive component) may be copied, for example, from another application, such as another messaging application or a different application, that supports interactive components. As a more specific example, a user may copy an interactive component from an email message that was received by the user, and may paste the interactive component into another email that is being composed by the user. As another example, the interactive component, or a portion thereof, may be copied from an application other than a messaging application, such as, for example, a word processing application, and may be pasted into an email being composed in the messaging application. In any event, navigation information that may point to a storage component (e.g., a file) in a shared storage that stores content of the interactive component may be encoded into a link (e.g., a link such as a URL link) that may be provided in connection with pasting the interactive component into the message. Accordingly, block 904 may involve parsing the representation of the interactive component (e.g., a link such as a URL link) being pasted into the message, extracting the navigation information, and resolving the navigation information to obtain the linking parameters (e.g., user drive identifier, file identifier, etc.) for linking the interactive component to the content of the interactive component in the file in the user drive, in an embodiment.

The method 900 may proceed to blocks 908-916. At block 908, a placeholder for the interactive component is generated and placed in the message by an editor being used to run the application. Blocks 908-916 may be the same as or similar to, respectively, the corresponding blocks 808-816 of the method 800 of FIG. 8, in an embodiment. At block 912, the interactive component may be rendered and hydrated. At block 914, the rendering of the interactive component may displayed in the message in the user interface of the application. The interactive component may then be updated by a user directly in the message in the window pane of the user interface, and the updates may be synched, in real-time, with the content of the interactive component that is stored in the storage component (e.g., file in the user drive) such that the content of the interactive component that is stored in the storage component remains in synch with the content of the interactive component rendered at the message. At block 916, the interactive component may be shared with one or more other users, and may further be operated on by the one or more other users via respective renderings of the interactive component displayed in user interfaces of corresponding applications to the one or more other users.

Figure 10:
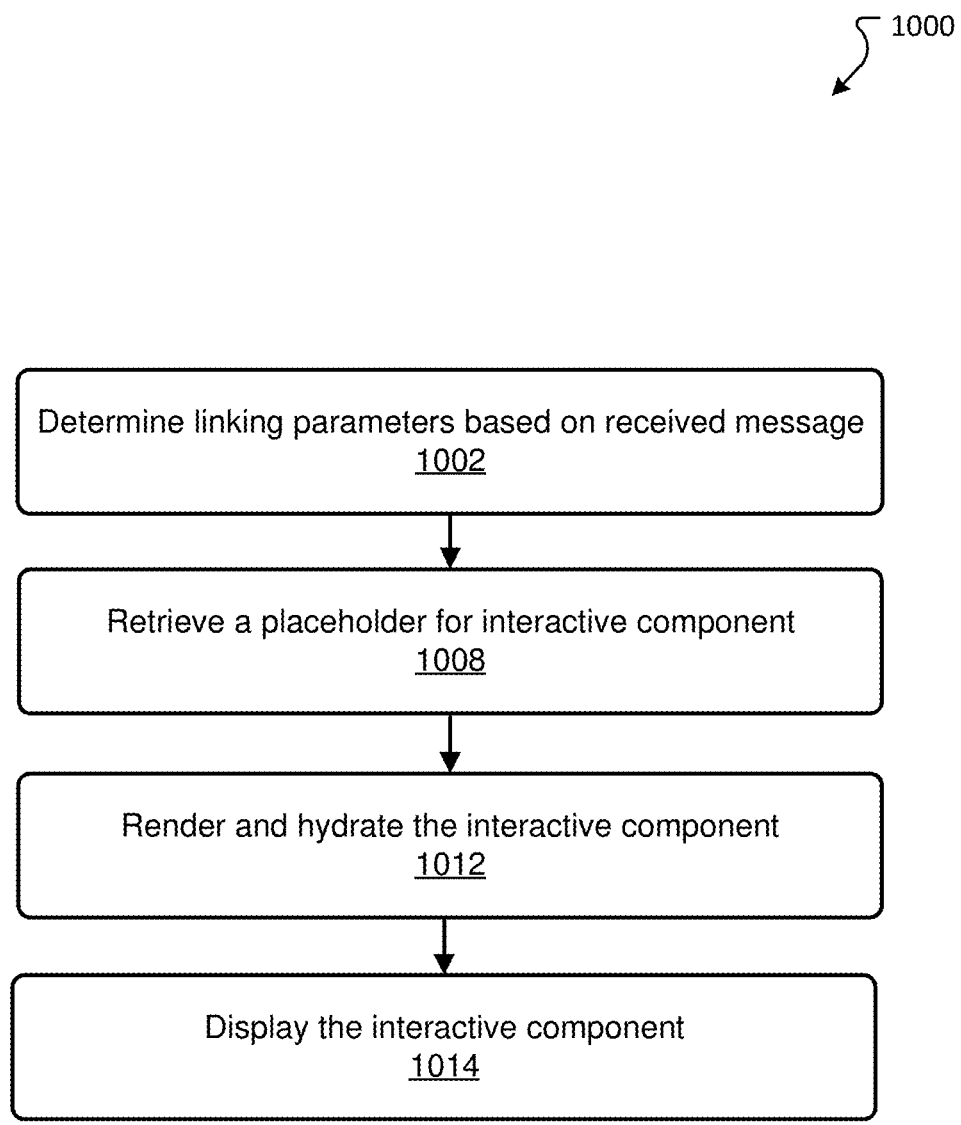
FIG. 10 depicts details of a method for rendering an interactive component of a received message in accordance with an embodiment of the present disclosure.

FIG. 10 depicts details of a method for rendering an interactive component in a received message in a user interface of an application. For instance, when a received message includes an embedded interactive component, the interactive component is rendered by the recipient's application in accordance with an embodiment of the present disclosure. A general order for the steps of the method 1000 is shown in FIG. 10. The method 1000 may include more or fewer steps or may arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, Application Specific Integrated Circuit (ASIC), a field programmable gate array (FPGA), a system on chip (SOC), or other hardware device. Hereinafter, the method 1000 shall be explained with reference to the systems, components, modules, software, data structures, user interfaces, etc. described in conjunction with FIGS. 1-9.

The method 1000 is generally similar to the method 800 of FIG. 8 and includes like-numbered blocks with the method 800 of FIG. 8. However, whereas in the method 800, a new interactive component is created and rendered in a message being composed in a user interface of a sender's application, in the method 1000 an interactive component may be rendered in a display of a received message, for example, in a reading pane of an email client application.

The method 1000 includes a block 1002, at which linking parameters are extracted from a message received by the recipient's application. For example, navigation information associated with a message may point or otherwise map to a storage component (e.g., a file) in a shared storage that stores content of the interactive component. The navigation information may be encoded into the message received by the recipient's application. Accordingly, block 1002 may involve parsing the received message, extracting or otherwise obtaining the linking or navigation parameters (e.g., user drive identifier, file identifier, etc.) from the received message, in an embodiment.

The method 1000 may proceed to blocks 1008-1014. Blocks 1008-1014 may be the same as or similar to, respectively, the corresponding blocks 808-814 of the method 800 of FIG. 8, in an embodiment. At block 1008, a placeholder for the interactive component is retrieved from the message by an editor being used to run the application. At block 1012, the interactive component may be rendered and hydrated. At block 1014, the rendering of the interactive component may be displayed in the received message in the window pane of the user interface of the recipient's application. The content of the interactive component may then be operated on by a recipient user directly in the received message in the window pane of the user interface of the recipient's application, and the updates to the content may be synchronized with the content of the interactive component stored in the shared storage.

Figure 11:
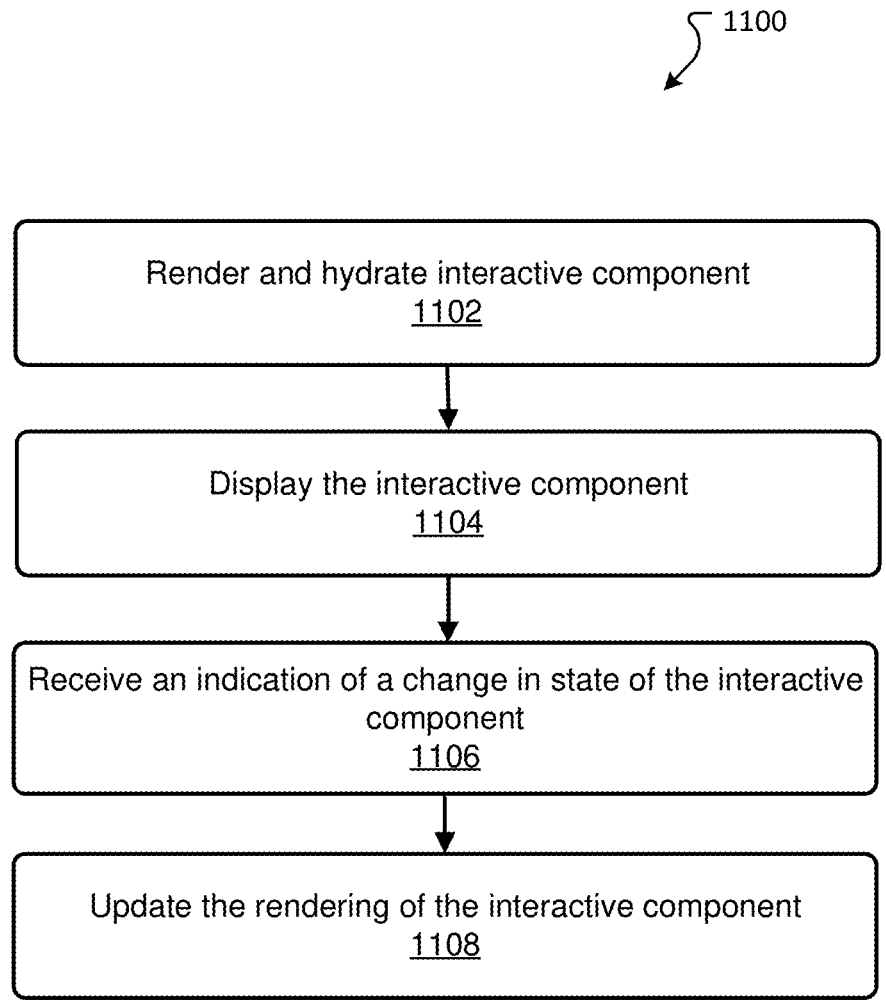
FIG. 11 depicts details of a method for synchronizing content of an interactive component in a user interface of a messaging application, in accordance with an embodiment of the present disclosure.

FIG. 11 depicts details of a method for updating content of an interactive component that may be rendered and displayed in a window pane of a user interface of a sender's application and/or a recipient's application in accordance with an embodiment of the present disclosure. A general order for the steps of the method 1100 is shown in FIG. 11. The method 1100 may include more or fewer steps or may arrange the order of the steps differently than those shown in FIG. 11. The method 1100 can be executed as a set of computer-executable instructions executed by a computer system and encoded or stored on a computer readable medium. Further, the method 1100 can be performed by gates or circuits associated with a processor, Application Specific Integrated Circuit (ASIC), a field programmable gate array (FPGA), a system on chip (SOC), or other hardware device. Hereinafter, the method 1100 shall be explained with reference to the systems, components, modules, software, data structures, user interfaces, etc. described in conjunction with FIGS. 1-10.

The method 1100 includes a block 1102 at which an interactive component is rendered and hydrated at an application. The method 1100 also includes a block 1104 at which the rendering of the interactive component is displayed in a window pane of a user interface of the application. Blocks 1102-1104 may correspond to blocks 812-814 of FIG. 8, 912-914 of FIG. 9, blocks 1012-1014 of FIG. 10, in various embodiments.

At block 1106, an update indication is received at the sender's and/or recipient's application. The update indication may be received at the application from the shared storage and/or from a synchronization service that may be running on a server, for example. The update indication may indicate that a change has occurred in the content of the interactive component stored in the shared storage. At block, 1108, content of the interactive component rendered by the application is updated to reflect the change to the content of the interactive component stored in the shared storage.

Figure 12:
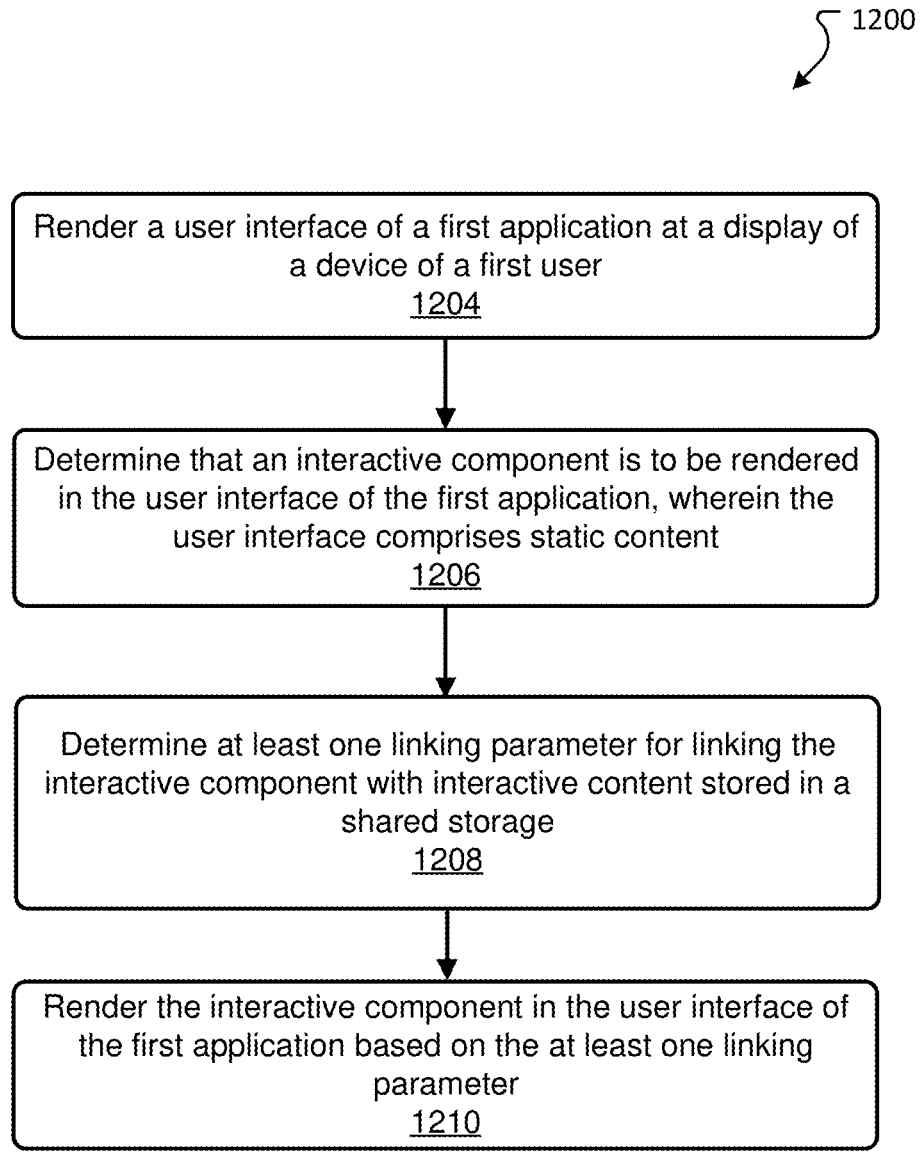
FIG. 12 depicts details of a method for rendering an interactive component in a user interface of a messaging application, in accordance with an embodiment of the present disclosure.

FIG. 12 depicts details of a method 1200 for displaying interactive content in an application. The method 1200 is described below generally in the context of the application being a messaging application, such as an email client application. However, the method 1200 may be utilized with suitable applications other than messaging applications, in some embodiments. A general order for the steps of the method 1200 is shown in FIG. 12. The method 1200 may include more or fewer steps or may arrange the order of the steps differently than those shown in FIG. 12. The method 1200 can be executed as a set of computer-executable instructions executed by a computer system and encoded or stored on a computer readable medium. Further, the method 1200 can be performed by gates or circuits associated with a processor, Application Specific Integrated Circuit (ASIC), a field programmable gate array (FPGA), a system on chip (SOC), or other hardware device. Hereinafter, the method 1200 shall be explained with reference to the systems, components, modules, software, data structures, user interfaces, etc. described in conjunction with FIGS. 1-11.

At block 1202, a user interface of a first application may be rendered at a display device of a first user is rendered. In an embodiment, a user interface of a messaging application, such as an email application or a chat application, may be rendered. In another embodiment, a user interface of a suitable application other than a messaging application may be rendered. For example, a user interface of a word processing application, a spreadsheet application, a notebook application, a presentation application, etc. may be rendered. In an embodiment, one of the user interfaces 116, 202, 302, 402, 602 described above is rendered. In other embodiments, suitable user interfaces different from the user interfaces described above may be rendered.

At block 1204, it is determined that an interactive component is to be rendered in the user interface of the first application. It may be determined, for example, that the interactive component is to be rendered in-line with static content of the user interface. The method may then proceed to block 1208 at which at least one linking parameter for linking the interactive component with interactive content stored in a shared storage may be determined. The at least one linking parameter may be determined, for example, in response to receiving a message comprising the interactive content by the first application. In another embodiment, the at least one linking parameter may be determined in response to receiving user input, such as a selection of an interactive component type from a menu that may be displayed to the first user by the first application, or detecting that an interactive component was pasted into the user interface. The at least one linking parameter may identify a storage component, such as a file in a user drive of the first user, in shared storage that may be accessible by the first application and at least a second application.

At block 1210, the interactive component may be rendered in the user interface of the first application based on the at least one linking parameter. Rendering the interactive component may cause display of the interactive content associated with the interactive component with the static content of the user interface. Interactive content of the interactive component in the user interface of the first application may be synchronized with the interactive content of the interactive component stored in the shared storage. Changes to the interactive content made by a second user of the second application may then be updated, via the interactive content stored in the shared storage, in real-time within the interactive component rendered in the user interface of the first application.

Figure 13:
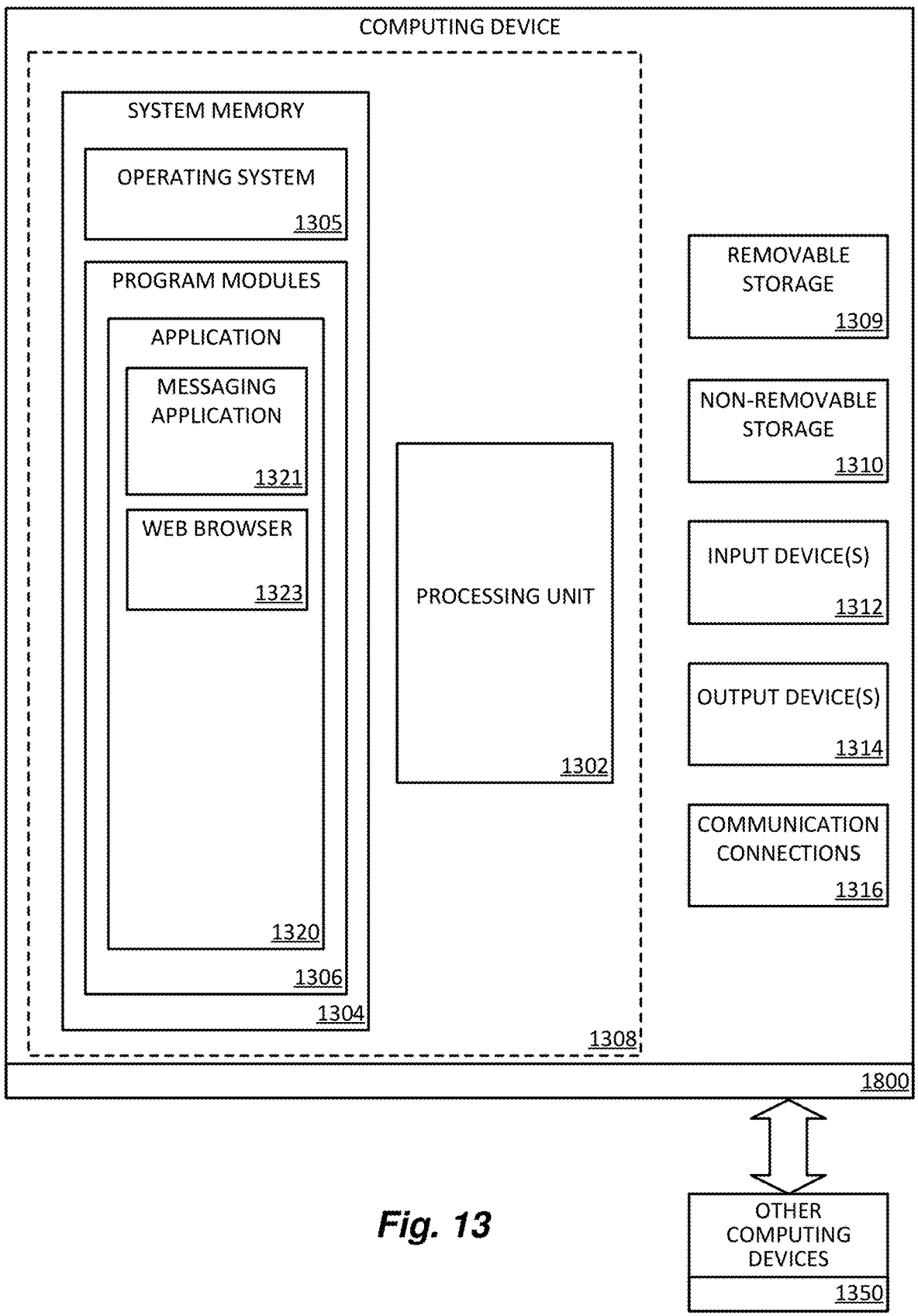
FIG. 13 is a block diagram illustrating physical components (e.g., hardware) of a computing device with which aspects of the disclosure may be practiced.

FIGS. 13-14 and the associated descriptions provide a discussion of a variety of operating environments in which aspects of the disclosure may be practiced. However, the devices and systems illustrated and discussed with respect to FIGS. 13-14 are for purposes of example and illustration and are not limiting of a vast number of computing device configurations that may be utilized for practicing aspects of the disclosure, described herein.

FIG. 13 is a block diagram illustrating physical components (e.g., hardware) of a computing device with which aspects of the disclosure may be practiced. The computing device components described below may be suitable for the computing and/or processing devices described above. In a basic configuration, the computing device 1300 may include at least one processing unit 1302 and a system memory 1304. Depending on the configuration and type of computing device, the system memory 1304 may comprise, but is not limited to, volatile storage (e.g., random-access memory (RAM)), non-volatile storage (e.g., read-only memory (ROM)), flash memory, or any combination of such memories.

The system memory 1304 may include an operating system 1305 and one or more program modules 1306 suitable for running software application 1320, such as one or more components supported by the systems described herein. As examples, system memory 1304 may include an application 1321 (e.g., a messaging application) and/or a web browser 1323. The application 1321 may be the same as or similar to the applications previously described; the web browser may be the same as or similar to the web browser as previously described. The operating system 1305, for example, may be suitable for controlling the operation of the computing device 1300.

Furthermore, embodiments of the disclosure may be practiced in conjunction with a graphics library, other operating systems, or any other application program and is not limited to any particular application or system. This basic configuration is illustrated in FIG. 13 by those components within a dashed line 1308. The computing device 1300 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306 (e.g., application 1320) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1300 may also have one or more input device(s) 1312 such as a keyboard, a mouse, a pen, a sound or voice input device, a touch or swipe input device, etc. The output device(s) 1314 such as a display, speakers, a printer, etc. may also be included. The aforementioned devices are examples and others may be used. The computing device 1300 may include one or more communication connections 1316 allowing communications with other computing devices 1350. Examples of suitable communication connections 1316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1304, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. Any such computer storage media may be part of the computing device 1300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 14A:
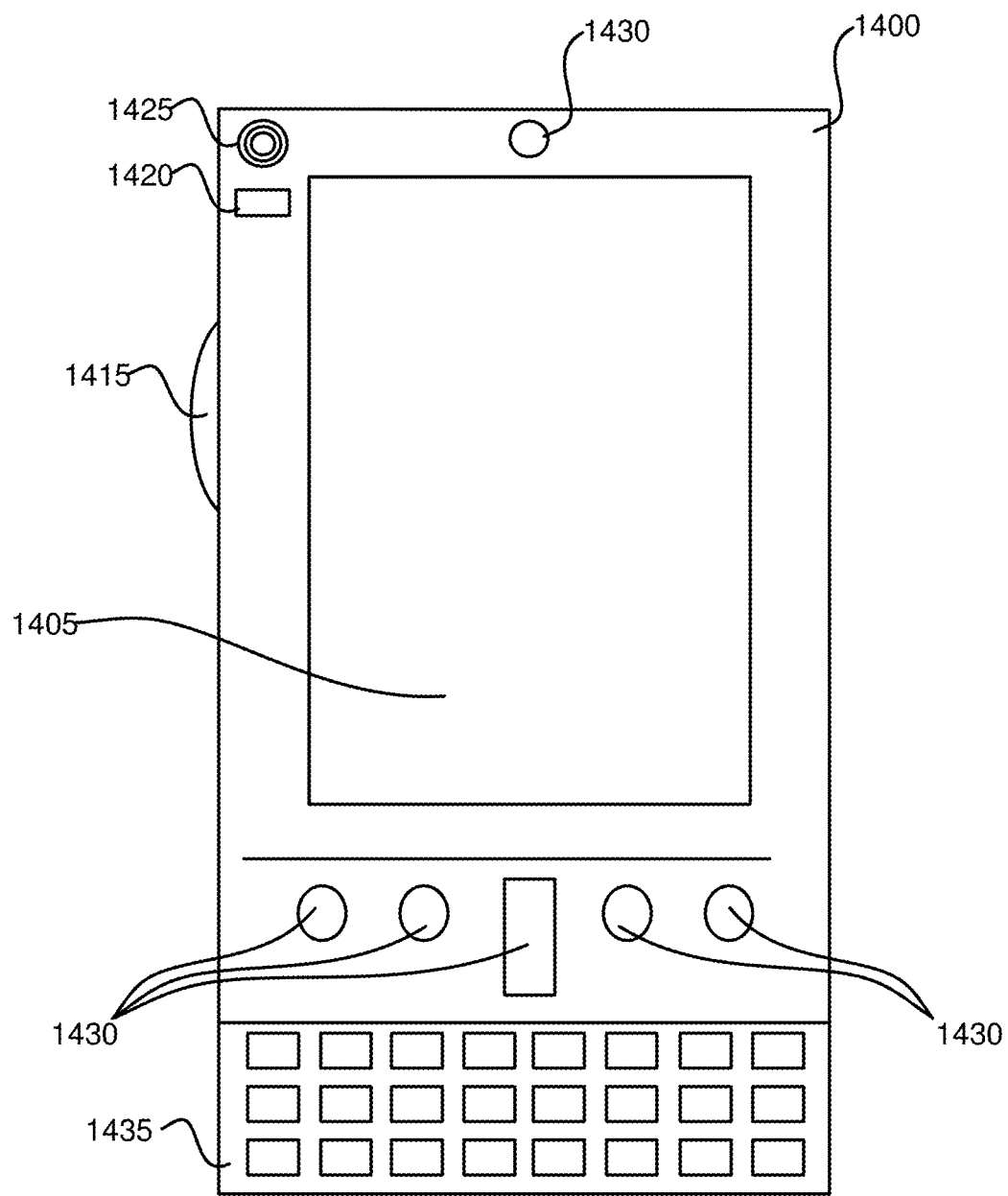
FIGS. 14A-14B illustrate a mobile computing device with which embodiments of the disclosure may be practiced.
Figure 14B:
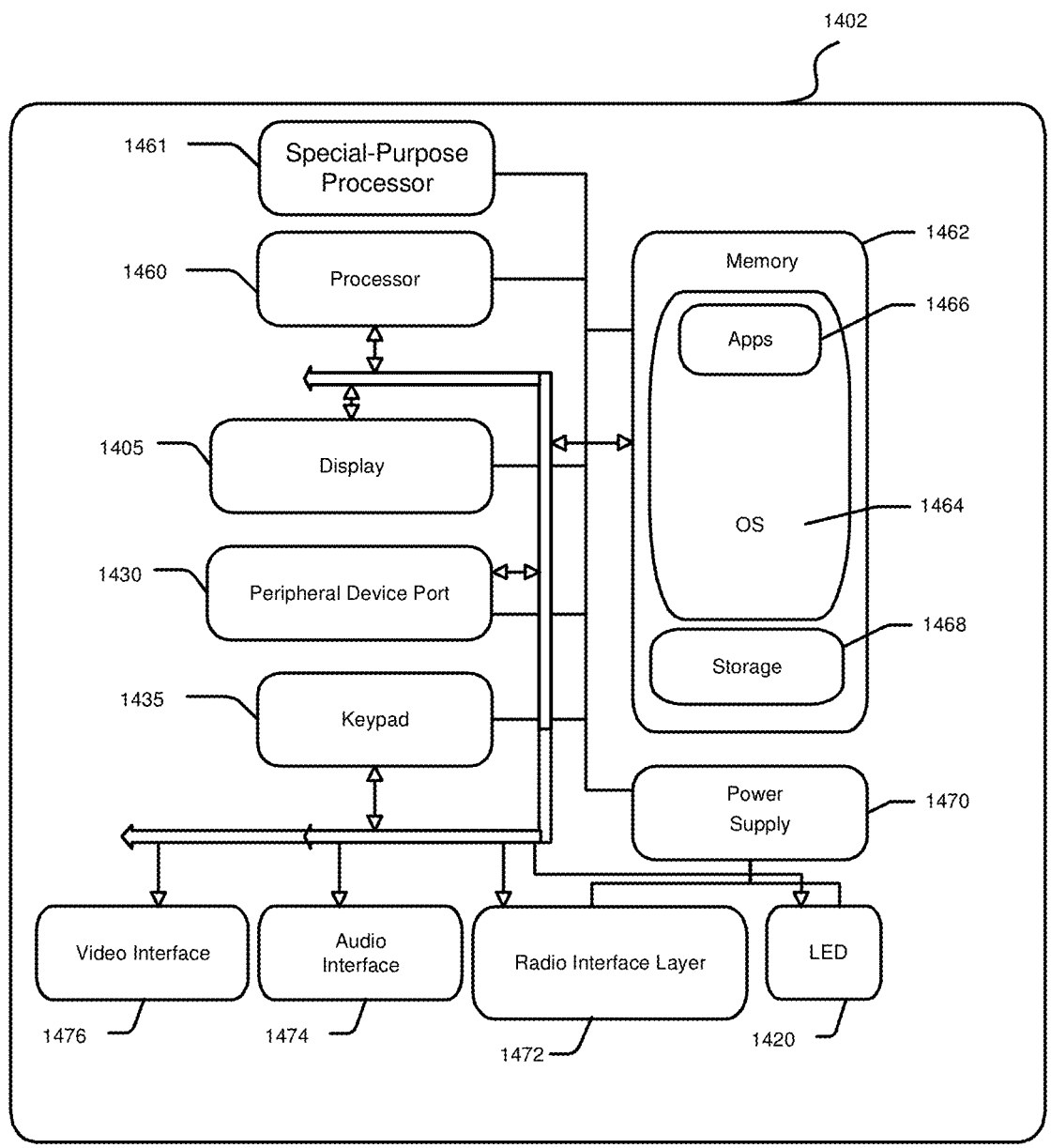

FIGS. 14A-14B illustrate a mobile computing device 1400, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 14A, one aspect of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display).

If included, an optional side input element 1415 allows further user input. The side input element 1415 may be a rotary switch, a button, or any other type of manual input element. In alternative aspects, mobile computing device 1400 may incorporate greater or fewer input elements. For example, the display 1405 may not be a touch screen in some embodiments.

In yet another alternative embodiment, the mobile computing device 1400 is a portable phone system, such as a cellular phone. The mobile computing device 1400 may also include an optional keypad 1435. Optional keypad 1435 may be a physical keypad or a "soft" keypad generated on the touch screen display.

In various embodiments, the output elements include the display 1405 for showing a graphical user interface (GUI), a visual indicator 1420 (e.g., a light emitting diode), and/or an audio transducer 1425 (e.g., a speaker). In some aspects, the mobile computing device 1400 incorporates a vibration transducer for providing the user with tactile feedback. In yet another aspect, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one aspect of a mobile computing device. That is, the mobile computing device 1400 can incorporate a system (e.g., an architecture) 1402 to implement some aspects. In one embodiment, the system 1402 is implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400 described herein (e.g., search engine, extractor module, relevancy ranking module, answer scoring module, etc.).

The system 1402 has a power supply 1470, which may be implemented as one or more batteries. The power supply 1470 might further include an external power source, such as an AC adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated embodiment, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present disclosure, the microphone may also serve as an audio sensor to facilitate control of notifications, as will be described below. The system 1402 may further include a video interface 1476 that enables an operation of an on-board camera 1430 to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 1468.

Data/information generated or captured by the mobile computing device 1400 and stored via the system 1402 may be stored locally on the mobile computing device 1400, as described above, or the data may be stored on any number of storage media that may be accessed by the device via the radio interface layer 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio interface layer 1472 or via a distributed computing network. Similarly, such data/information may be readily transferred between computing devices for storage and use according to well-known data/information transfer and storage means, including electronic mail and collaborative data/information sharing systems.

Figure 15:
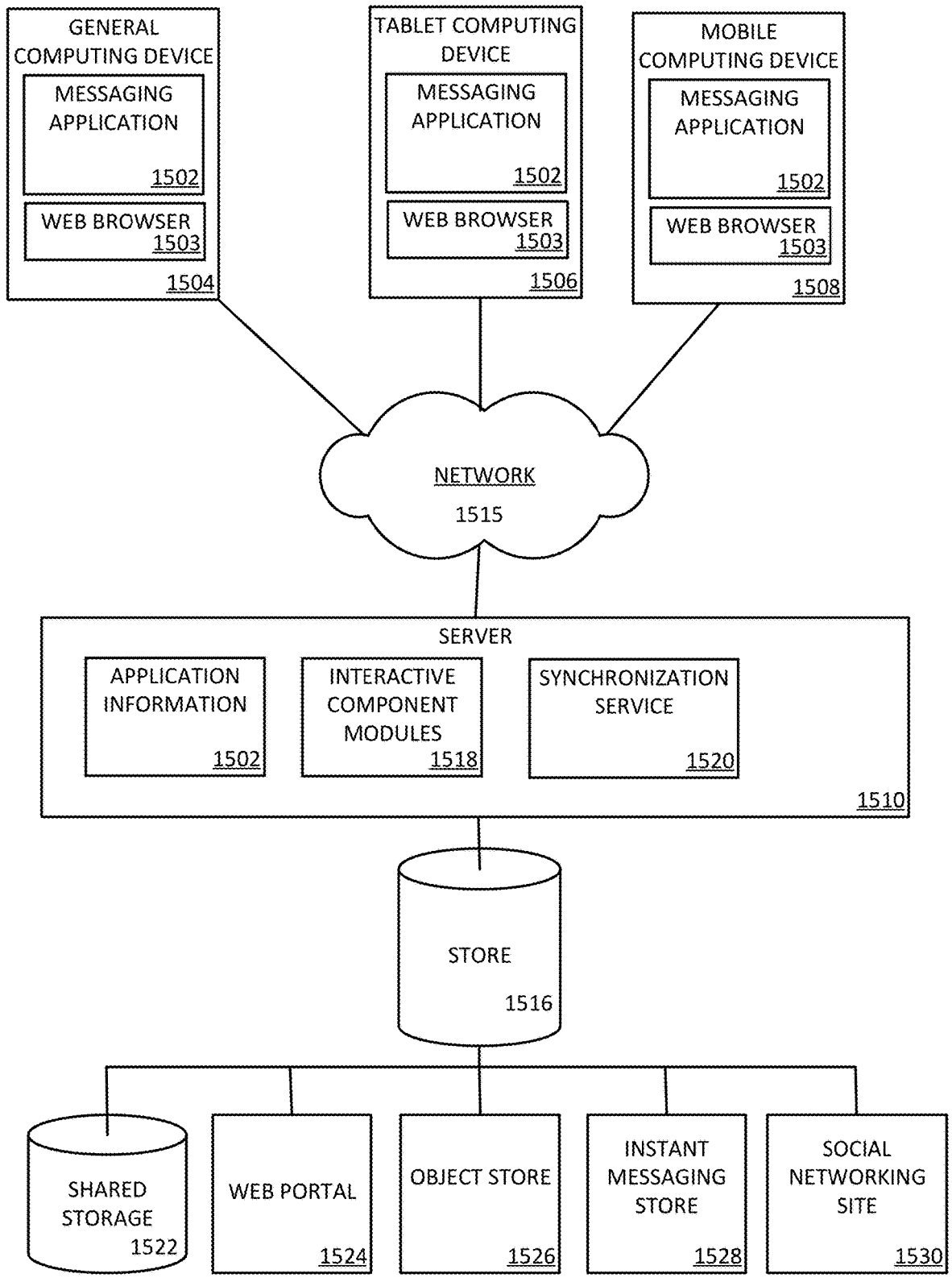
FIG. 15 illustrates an example architecture of a system in which embodiments of the disclosure may be practiced.

FIG. 15 illustrates one aspect of the architecture of a system for processing data received at a computing system from a remote source, such as a personal computer 1504, tablet computing device 1506, or mobile computing device 1508, as described above. The personal computer 1504, tablet computing device 1506, or mobile computing device 1508 may include an application 1502 (e.g., a messaging application) and/or a web browser 1503 as previously described. Content at a server device 1510 may be stored in different communication channels or other storage types. For example, various documents may be stored using a shared storage 1522, a web portal 1524, an object store 1526, an instant messaging store 1528, or a social networking site 1530.

One or more of the previously described program modules 1306 or software applications 1315 may be employed by server device 1510 and/or the personal computer 1504, tablet computing device 1506, or mobile computing device 1508, as described above. For example, the server device 1510 may include application information 1502, interactive component modules 1518, and/or a synchronization service 1520. The application 1502 may be the same as or similar to the messaging application previously described; the interactive component modules 1518 may be the same as or similar to the interactive component modules for rendering and displaying the interactive component as previously described. The server device 1510 may be a single server device as depicted in FIG. 15, or the server device 1510 may comprise multiple server devices. For example, the application information 1502, the interactive component modules 1518 and/or a synchronization service 1520 may reside on separate server devices 1510.

The server device 1510 may provide data to and from a client computing device such as a personal computer 1504, a tablet computing device 1506 and/or a mobile computing device 1508 (e.g., a smart phone) through a network 1515. By way of example, the computer system described above may be embodied in a personal computer 1504, a tablet computing device 1506 and/or a mobile computing device 1508 (e.g., a smart phone). Any of these embodiments of the computing devices may obtain content from the store 1516, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
one or more computer readable storage media; and
program instructions stored on the one or more computer readable storage media that, when executed by at least one processor, cause the at least one processor to:
cause a user interface of a first application to be rendered on a display of a first device;
determine that an interactive component is to be rendered in the user interface of the first application for user interaction with a first user, wherein the user interface comprises static content;
in response to determining that the interactive component is to be rendered in the user interface of the first application:
determine at least one linking parameter for linking the interactive component with interactive content stored in a shared storage;
generate a placeholder of the interactive component to render the placeholder according to the at least one linking parameter by inserting a code indicating the placeholder in-line with the static content in the user interface of the first application according to a selection of a location of the placeholder by the first user;
cause the interactive component to be rendered at the location of the placeholder in the user interface of the first application based on the at least one linking parameter, wherein rendering the interactive component causes display of the interactive content with the static content of the user interface and an edit of the interactive content by the first user prior to sharing the static content with a second user to enable a collaborative interaction with the second user;

update the interactive content within the interactive component with a change to the interactive content made by the second user of a second application in real-time within the interactive component rendered in the user interface of the first application, wherein the second user is distinct from the first user;

cause the at least one processor to provide, to the shared storage, an indication of the change to the interactive content made in the user interface of the second application, wherein the interactive content stored in the shared storage is updated to reflect the change to the interactive content:

display an in-line indicator in the interactive content identifying the second user as changing the interactive content, in real-time;

receive an indication of a further change to the interactive content of the interactive component by the first user;

update the interactive content of the interactive component with the further change in the shared storage; and cause the at least one processor to, in connection with updating the interactive content of the interactive component in the shared storage, cause the further change to the interactive content to be displayed to the second user by the second application.

2. The system of claim 1, wherein the program instructions, when executed by the at least one processor, further cause the at least one processor to cause display of a menu comprising a plurality of predetermined interactive component types in the user interface.

3. The system of claim 2, wherein the program instructions, when executed by the at least one processor, cause the at least one processor to determine the at least one linking parameter in response to receiving a selection of an interactive component type among the plurality of predetermined interactive component types.

4. The system of claim 1, wherein the program instructions, when executed by the at least one processor, cause the at least one processor to determine the at least one linking parameter in response to the interactive content being pasted into the user interface of the first application.

5. The system of claim 1, wherein the program instructions, when executed by the at least one processor, cause the at least one processor to determine the at least one linking parameter in response to receiving a message comprising the at least one linking parameter by the first application.

6. The system of claim 1, wherein the at least one linking parameter identifies a storage component in which the interactive content of the interactive component is stored, the storage component residing in the shared storage accessible by the first application and the second application.

7. The system of claim 1, wherein the program instructions, when executed by the at least one processor, cause the at least one processor to render the interactive component with a header portion and a body portion in the user interface of the first application.

8. The system of claim 7, wherein the header portion includes a link to the interactive content in the shared storage, and wherein the body portion includes the interactive content.

9. The system of claim 1, wherein the program instructions, when executed by the at least one processor, cause the at least one processor to provide the interactive content associated with the interactive component in-line with the static content provided in the user interface.

10. The system of claim 1, wherein the program instructions, when executed by the at least one processor, cause the at least one processor to render the interactive component according to a scheme that visually distinguishes the interactive component from the static content in the user interface.

11. The system of claim 1, wherein the program instructions, when executed by the at least one processor, cause the at least one processor to:

generate a message in the user interface of the first application, wherein generating the message includes encoding the at least one linking parameter into the message; and cause the message to be sent to at least the second user, wherein the at least one linking parameter is operable to enable the second application to render the interactive component in the message.

12. A method for displaying interactive content in a first messaging application, the method comprising:

rendering a user interface of the first messaging application in a display of a first device for user interaction with a first user;

receiving a first indication to compose a message in the user interface of the first messaging application, wherein the message comprises static content;

receiving a second indication to insert an interactive component within the message in the user interface of the first messaging application;

in response to receiving the second indication, creating the interactive component including determining at least one linking parameter for rendering the interactive component and linking interactive content associated with the interactive component to a shared storage;

generate a placeholder of the interactive component to render the placeholder according to the at least one linking parameter by inserting a code indicating the placeholder in-line with the static content in the user interface of the first messaging application according to a selection of a location of the placeholder by the first user;

based on the at least one linking parameter, rendering the interactive component within the message at the location of the placeholder in the user interface of the first messaging application, wherein rendering the interactive component comprises displaying the interactive content associated with the interactive component with the static content of the message and causing an edit of the interactive content by the first user prior to sharing the static content with a second user to enable a collaborative interaction between the first user and the second user;

updating the interactive content within the interactive component with a change to the interactive content made by the second user of a second messaging application in real-time in the interactive component rendered within the message in the user interface of the first messaging application, wherein the second user is distinct from the first user;

providing, to the shared storage, an indication of the change to the interactive content made in the user interface of the second messaging application, wherein the interactive content stored in the shared storage is updated to reflect the change to the interactive content;

displaying an in-line indicator in the interactive content identifying the second user as the user as changing the interactive content, in real-time;

receiving an indication of a further change to the interactive content of the interactive component by the first user;

updating the interactive content of the interactive component with the further change in the shared storage; and causing, in connection with updating the interactive content of the interactive component in the shared storage, the further change to the interactive content to be displayed to the second user by the second messaging application.

13. The method of claim 12, further comprising displaying a menu comprising a plurality of predetermined interactive component types, wherein the at least one linking parameter is determined based on a selection of an interactive component type among the plurality of predetermined interactive component types.

14. The method of claim 12, further comprising causing display of the interactive content associated with the interactive component in-line with the static content in the message.

15. A computer storage medium storing computer-executable instructions that when executed by at least one processor cause a computer system to:

receive a message to be displayed in a user interface of a first messaging application for user interaction with a first user, the message comprising an indication that an interactive component is to be rendered in-line with static content of the message in the user interface of the first messaging application;

process the received message to determine at least one linking parameter for linking the interactive component with interactive content stored in a shared storage;

generate a placeholder of the interactive component to render the placeholder according to the at least one linking parameter by inserting a code indicating the placeholder in-line with the static content in the user interface of the first messaging application according to a selection of a location of the placeholder by the first user;

based on the at least one linking parameter, retrieve at least the interactive content from the shared storage;

cause the message to be rendered at the location of the placeholder in the user interface of the first messaging application, wherein rendering the message in the user interface of the first messaging application includes rendering the interactive component, with the interactive content retrieved from the shared storage, within the message in-line with the static content of the message in the user interface of the first messaging application and an edit of the interactive content by the first user prior to sharing the static content with a second user to enable a collaborative interaction with the second user;

receive, in real-time, an indication of a change to content in the interactive component, wherein change results from an interaction with the interactive content by the second user via a second messaging application, wherein the second user is distinct from the first user;

cause the at least one processor to provide, to the shared storage, an indication of the change to the interactive content made in the user interface of the second messaging application, wherein the interactive content stored in the shared storage is updated to reflect the change to the interactive content;

update, in real-time, the rendering of the interactive component with the change to the interactive content by the second user in the user interface of the first messaging application, wherein the rendering includes an in-line indicator identifying the second user as a user who made the change to the interactive content in real-time;

display the in-line indicator in line identifying the second user as the user who made the change with the change to the interactive content in real-time;

receive an indication of a further change to the interactive content of the interactive component by the first user;

update the interactive content of the interactive component with the further change in the shared storage; and cause, in connection with updating the interactive content of the interactive component in the shared storage, the further change to the interactive content to be displayed to the second user by the second messaging application.

16. The computer storage medium of claim 15, wherein the in-line indicator causes the display of initials or a picture of the second user.

17. The computer storage medium of claim 15, wherein the computer-executable instructions, when executed by the at least one processor, further cause the computer system to update the interactive content of the interactive component with the change in the shared storage.

* * * * *